US012301299B2

(12) United States Patent
Fehrenbach et al.

(10) Patent No.: US 12,301,299 B2
(45) Date of Patent: May 13, 2025

(54) TECHNIQUES FOR SIGNALING, E.G., FOR NEW RADIO UNLICENSED (NR-U)

(71) Applicant: Fraunhofer-Gesellschaft zur Foerderung der angewandten Forschung e.V., Munich (DE)

(72) Inventors: Thomas Fehrenbach, Berlin (DE); Cornelius Hellge, Berlin (DE); Robin Rajan Thomas, Berlin (DE); Baris Goektepe, Berlin (DE); Thomas Wirth, Berlin (DE); Thomas Schierl, Berlin (DE); Roya Ebrahim Rezagah, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 574 days.

(21) Appl. No.: 17/543,489

(22) Filed: Dec. 6, 2021

(65) Prior Publication Data
US 2022/0095192 A1 Mar. 24, 2022

Related U.S. Application Data

(63) Continuation of application No. PCT/EP2020/065696, filed on Jun. 5, 2020.

(30) Foreign Application Priority Data

Jun. 7, 2019 (EP) ..................... 19179104

(51) Int. Cl.
H04W 4/00 (2018.01)
H04B 17/382 (2015.01)
(Continued)

(52) U.S. Cl.
CPC .......... *H04B 17/382* (2015.01); *H04W 36/08* (2013.01); *H04W 36/302* (2023.05);
(Continued)

(58) Field of Classification Search
CPC ...... H04W 36/30; H04W 48/08; H04W 48/16
(Continued)

(56) References Cited

U.S. PATENT DOCUMENTS

2009/0291686 A1* 11/2009 Alpert ............... H04W 36/0085
455/436
2016/0227571 A1 8/2016 Baek et al.
(Continued)

FOREIGN PATENT DOCUMENTS

CN 108713330 A 10/2018
CN 109565726 A 4/2019
(Continued)

OTHER PUBLICATIONS

3GPP, "5G; Non-Access-Stratum (NAS) protocol for 5G System (5GS); Stage 3", TS 24.501 version 16.5.1 Release 16, Aug. 2020. Uploaded in 2 parts.
(Continued)

Primary Examiner — Temica M Beamer
(74) Attorney, Agent, or Firm — Perkins Coie LLP; Michael A. Glenn

(57) ABSTRACT

The present document relates to techniques (e.g., devices and methods) for signalling, e.g., for new radio unlicensed (NR-U).
A user equipment (UE) exchanges control signals with a first cell and a second cell. The first cell is a licensed or unlicensed cell and the at least one second cell is an unlicensed cell. The UE exchanges control signals with the first cell and, meanwhile:
 receives assistance information assisting the UE in receiving at least one discovery reference signal, the assis-
(Continued)

tance information including timing information regarding the timing of the at least one discovery reference signal periodically sent by the at least one second cell; perform measurement(s) on discovery reference signal as acquired by the UE, from the at least one second cell, using the timing information included in the assistance information.

16 Claims, 10 Drawing Sheets

(51) Int. Cl.
  *H04W 36/08* (2009.01)
  *H04W 36/30* (2009.01)
  *H04W 36/36* (2009.01)
  *H04W 48/08* (2009.01)
  *H04W 48/16* (2009.01)

(52) U.S. Cl.
  CPC .......... *H04W 36/36* (2013.01); *H04W 48/08* (2013.01); *H04W 48/16* (2013.01)

(58) Field of Classification Search
  USPC ........................................................ 370/331
  See application file for complete search history.

(56) References Cited

U.S. PATENT DOCUMENTS

| | | |
|---|---|---|
| 2017/0034728 A1 | 2/2017 | Zhang et al. |
| 2017/0311217 A1 | 10/2017 | Jung et al. |
| 2018/0049083 A1 | 2/2018 | Kubota et al. |
| 2019/0059029 A1 | 2/2019 | Lunden et al. |

FOREIGN PATENT DOCUMENTS

| | | |
|---|---|---|
| JP | 2017527217 A | 9/2017 |
| WO | 2016006450 A1 | 1/2016 |
| WO | 2016052017 A1 | 4/2016 |
| WO | 2017033606 A1 | 3/2017 |
| WO | 2017125591 A1 | 7/2017 |
| WO | 2018141754 A1 | 8/2018 |
| WO | 2018229105 A1 | 12/2018 |

OTHER PUBLICATIONS

3GPP, "5G; NR; Physical layer procedures for control", TS 38.213 version 16.2.0 Release 16, Jul. 2020.
3GPP, "Radio Resource Control (RRC) protocol specification (Release 15)", TR 38.331, V 15.3.0, Sep. 2018.
3GPP, "Study on LAA to Unlicensed Spectrum", TR 36.889 V 13.0.0, Jun. 2015.
3GPP, "Study on NR-based Access to Unlicensed Spectrum", TR 38.889 V 0.3.0, Nov. 2018.
3GPP-5G, "NR; Radio Resource Control (RRC)", TS 38.331 version 16.1.0 Release 16, Jul. 2020. Uploaded in 2 parts.
ETSI, "Broadband Radio Access Networks (BRAN)", 5 GHz high performance RLAN Harmonized EN covering the essential requirements of article 3.2 of the R&TTE Directive, ETSI EN 301 893 V1.7.1, Jun. 2012. Uploaded in 11 parts.
IEEE, "Wireless LAN Medium Access Control (MAC) and Physical Layer (PHY)", Standard 802.11-1997. Part 11, Nov. 1997. Uploaded in 2 parts.
Ng, Boon Loong, et al., "Unified access in licensed and unlicensed bands in LTE-A Pro and 5G", Industrial Technology Advances, vol. 6, No. 6, Jun. 2017, pp. 1-7.
Rhode & Schwarz, "Lte-Advanced Pro Introduction eMBB Technology Components in 3GPP Release 13/14", Tech. Report, No. PD 5215.8258.52, May 2018.
Nokia, "Considerations on cell reselection in Idle/Inactive mode for NR-U", R2-1810218, 3GPP TSG RAN WG2 #AHS, 3GPP server published on Jun. 21, 2018, 2018.
Nokia, "RRM framework and RRC connected mode mobility for NR-U", R2-1810232, 3GPP TSG RAN WG2 #AHS, 3GPP server published on Jun. 21, 2018., 2018.
Qualcomm Incorporated, "Mobility and RLM for NR unlicensed", R2-1810325, 3GPP TSG RAN WG2 #AHS, 3GPP server published on Jun. 22, 2018, 2018.

* cited by examiner

TECHNIQUES FOR SIGNALING, E.G., FOR NEW RADIO UNLICENSED (NR-U)

CROSS-REFERENCES TO RELATED APPLICATIONS

This application is a continuation of copending International Application No. PCT/EP2020/065696, filed Jun. 5, 2020, which is incorporated herein by reference in its entirety, and additionally claims priority from European Application No. EP 19179104.5, filed Jun. 7, 2019, which is incorporated herein by reference in its entirety.

BACKGROUND OF THE INVENTION

The present document relates to techniques (e.g., devices and methods) for signalling, e.g., for new radio unlicensed (NR-U).

NR-Unlicensed (NR-U) is a technology being discussed in 3GPP, which is designed to provide NR cellular communications to users the unlicensed frequency. This implies that NR-U has to co-exist with other communication technologies such as IEEE 802.11 (WiFi), etc.

In order to fulfil the fair use requirements, the unlicensed band can be accessed through Listen-Before-Talk (LBT) procedures, in order to utilize the shared channel for cellular communications.

A key challenge in the unlicensed spectrum when compared to the licensed spectrum is the limited number of transmission opportunities, which involve adaptation of certain specified NR operations.

More in general, procedures based on competition to the access to the communication may have inconvenients, as no time slot is granted to a user equipment (UE). For example, when a UE intends to send a transmission to a base station (BS), a delay may be caused, e.g., because of simultaneous transmissions of the BS with other UEs. Therefore, techniques for increasing the reliability are in general pursued, e.g., to speed up the communications. Some key issues to be addressed include:
1) Increase the robustness of control plane signalling in order to overcome LBT failures (such as excessive delays) by the UE for the transmission of radio resource control information.
2) Provision of Discovery Measurement Time Configuration (DMTC) and RSSI Measurement Time Configuration (RMTC) information, e.g., to enable Inter-RAT and Intra-RAT neighbouring cell measurements.

SUMMARY

An embodiment may have a user equipment, UE, configured for exchanging control signals, in uplink, UL, and/or downlink, DL, with a first cell and at least one second cell, wherein the first cell is a licensed or unlicensed cell and the at least one second cell is an unlicensed cell,
wherein the UE is configured to exchange control signals with the first cell and, meanwhile:
receive, from the first cell, assistance information for assisting the UE in receiving at least one discovery reference signal, wherein the assistance information includes at least timing information regarding the timing of the at least one discovery reference signal periodically sent by the at least one second cell;
perform measurement(s) on the at least one discovery reference signal as acquired by the UE, from the at least one second cell, using the timing information included in the assistance information.

Another embodiment may have a base station, BS, configured for exchanging control signals, in uplink, UL, and/or downlink, DL, with a user equipment, UE, and at least one second cell, wherein the BS is a licensed or unlicensed BS and the at least one second cell is an unlicensed cell, wherein the BS is configured to:
signal, to the UE, assistance information for assisting the UE in receiving at least one discovery reference signal, wherein the assistance information includes at least timing information regarding the timing of at least one discovery reference signal periodically sent by the at least one second cell.

According to another embodiment, a method involving a first cell and at least one second cell, wherein the first cell is a licensed or unlicensed cell and the at least one second cell is an unlicensed cell, may have the step of:
signalling, from the first cell to the UE, assistance information for assisting the UE in receiving discovery reference signals, wherein the assistance information includes at least timing information regarding the timing of at least one discovery reference signal periodically sent by the at least one second cell.

There is provided, in accordance to an aspect, a user equipment, UE, configured for exchanging control signals, in uplink, UL, and/or downlink, DL, with a first cell and at least one second cell, wherein the first cell is a licensed or unlicensed cell and the at least one second cell is an unlicensed cell,
wherein the UE is configured to exchange control signals with the first cell and, meanwhile:
receive, from the first cell, assistance information for assisting the UE in receiving at least one discovery reference signal, wherein the assistance information includes at least timing information regarding the timing of the at least one discovery reference signal periodically sent by the at least one second cell;
perform measurement(s) on the at least one discovery reference signal as acquired by the UE, from the at least one second cell, using the timing information included in the assistance information.

In accordance to an aspect, the UE may be configured to send a measurement report to the first cell, the measurement report including information concerning the performed measurement(s).

In accordance to an aspect, the UE may decide whether to initiate a handover, HO, procedure so that the UE communicates with the at least one second cell, wherein the HO procedure is based on the performed measurement(s) on the discovery reference signal(s).

In accordance to an aspect, there is provided a base station, BS, configured for exchanging control signals, in uplink, UL, and/or downlink, DL, with a user equipment, UE, and at least one second cell, wherein the BS is a licensed or unlicensed BS and the at least one second cell is an unlicensed cell, wherein the BS is configured to:
signal, to the UE, assistance information for assisting the UE in receiving at least one discovery reference signal, wherein the assistance information includes at least timing information regarding the timing of at least one discovery reference signal periodically sent by the at least one second cell.

In accordance to an aspect, the BS may perform a handover, HO, procedure so that the UE communicates with the at least one second cell, wherein the HO procedure is based on the performed measurement(s) on the discovery reference signal(s).

In accordance to an aspect, a system may compare a user equipment, UE as above and/or below, the first cell and the at least one second cell.

In accordance to an aspect, there is provided a method involving a first cell and at least one second cell, wherein the first cell is a licensed or unlicensed cell and the at least one second cell is an unlicensed cell, the method comprising:

signalling, from the first cell to the UE, assistance information for assisting the UE in receiving discovery reference signals, wherein the assistance information includes at least timing information regarding the timing of at least one discovery reference signal periodically sent by the at least one second cell.

The method may comprise performing a handover, HO, procedure, so that the UE communicates with the at least one second cell, wherein the HO procedure is based at least on measurement(s) performed on the discovery reference signal(s).

In accordance to an aspect, there is provided a UE, configured to exchange control signals, in uplink, UL, and/or downlink, DL, with a first cell and at least one second cell, wherein the first cell is an unlicensed cell and the at least one second cell is a licensed or an unlicensed cell, wherein the UE is configured to:

perform, with the first cell, an uplink, UL, and/or downlink, DL, communication of control signals according to a listen before talk, LBT, medium access strategy;

receive, from the first cell and in case of fulfilment of a predetermined pre-condition for starting a dual connectivity procedure between the UE and at least one selected second cell, configuration data including access information of the dual connectivity procedure and indicating the selected second cell;

after the reception of the configuration data, evaluating, by the UE, a condition associated to the access to the communication with the first cell; and in case of fulfilment of the condition, starting the dual connectivity procedure with the selected second cell.

In examples, the condition may be a link deterioration condition: it may be fulfilled when a comparatively high link deterioration is determined. The condition may be associated to the number of LBT failures: it may be fulfilled at the determination that a comparatively higher number of LBT failures has occurred. The condition may be associated to the number of packet losses: it may be fulfilled when the number of packet losses is over a threshold. The condition may be associated to the quality of service and/or service requirements: it may be fulfilled when the quality of service cannot be guaranteed anymore. The condition may be associated to the channel occupancy: it may be fulfilled when the channel occupancy is over a threshold.

In accordance to an aspect, there is provided a BS, configured to exchange control signals, in uplink, UL, and/or downlink, DL, with a user equipment, UE, and at least one second cell, wherein the BS is an unlicensed BS and the at least one second cell is a licensed or an unlicensed cell, wherein the BS is configured to:

perform an uplink, UL, and/or downlink, DL, communication of control signals with the UE according to a listen before talk, LBT, medium access strategy;

evaluate a predetermined pre-condition for starting a dual connectivity procedure between the UE and select a second cell;

in case of fulfilment of the predetermined pre-condition, signal, to the UE, configuration data including access information of the dual connectivity procedure and indicating the selected second cell, so that, after the reception of the configuration data, the UE may evaluate a condition associated to the access to the communication with the first cell, and in case of fulfilment of the condition, start the dual connectivity procedure with the selected second cell.

In accordance to an aspect, there is provided a system including a UE as above and/or below and the BS above and/or below, wherein the BS operates as the first cell.

In accordance to an aspect, there is provided a method involving a user equipment, UE and a plurality of cells, including a first cell, which is an unlicensed cell, and at least one second cell, which is either a licensed cell or an unlicensed cell, the at least one second cell being synchronized and in communication with the first cell, the method comprising:

between the UE and the first cell, performing an uplink, UL, and/or downlink, DL, communication of control signals according to a listen before talk, LBT, medium access strategy;

evaluating, by the first cell, a predetermined pre-condition for starting a dual connectivity procedure between the UE and selecting a second cell from the plurality of cells different from the first cell;

in case of fulfilment of the predetermined pre-condition, signalling, from the first cell to the UE, configuration data including access information of the dual connectivity procedure and indicating the selected second cell;

after the reception of the configuration data, evaluating, by the UE, a condition associated to the access to the communication with the first cell;

in case of fulfilment of the link deterioration condition, starting the dual connectivity procedure with the selected second cell.

In accordance to an aspect, there is provided a non-transitory memory unit storing instructions which, when executed by a processor, cause the processor to perform a method as above and/or below.

BRIEF DESCRIPTION OF THE DRAWINGS

Embodiments of the present invention will be detailed subsequently referring to the appended drawings, in which.

DETAILED DESCRIPTION OF THE INVENTION

Figure 8:
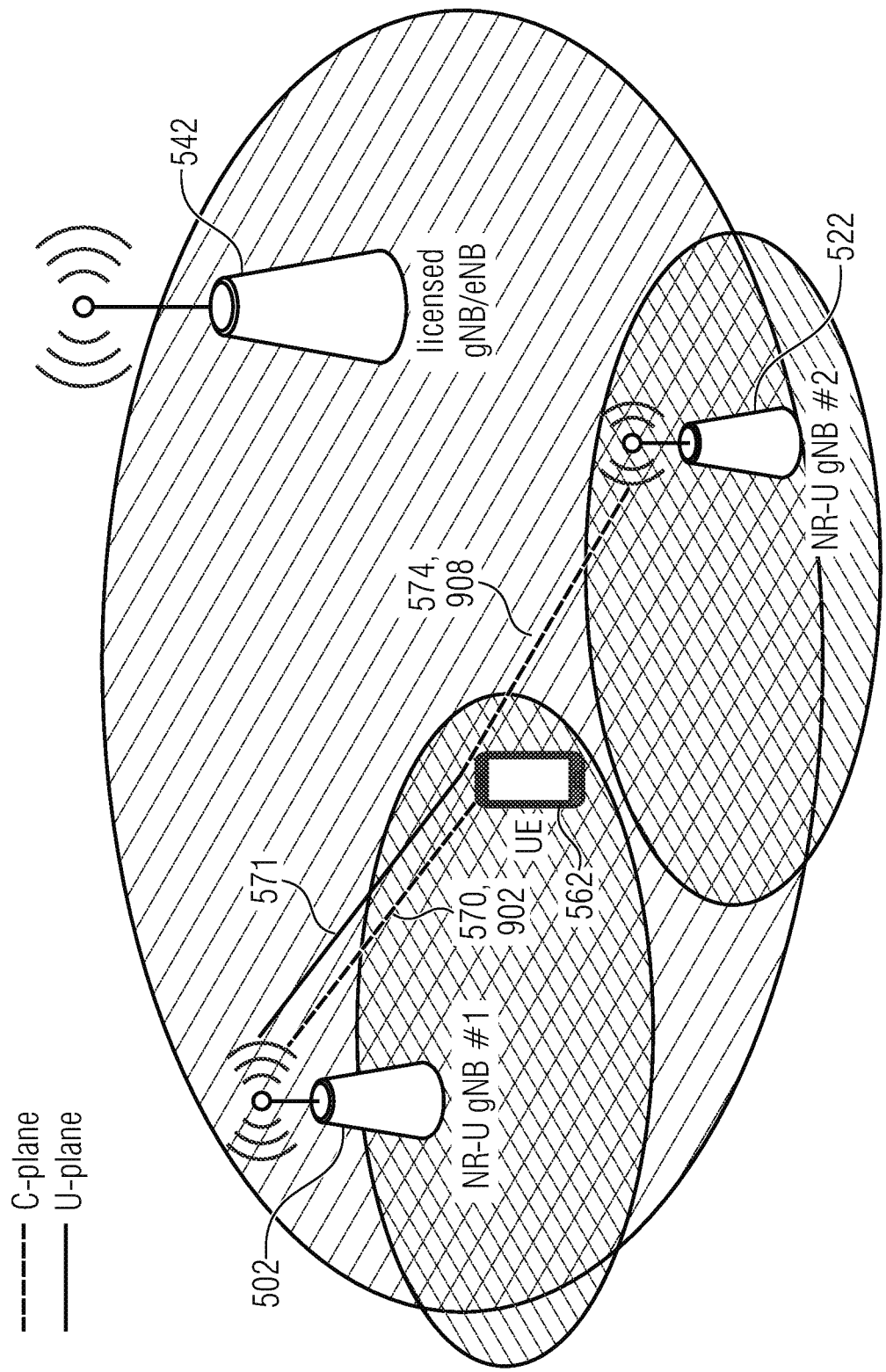
FIG. 8 shows a system according to an example.
Figure 9:
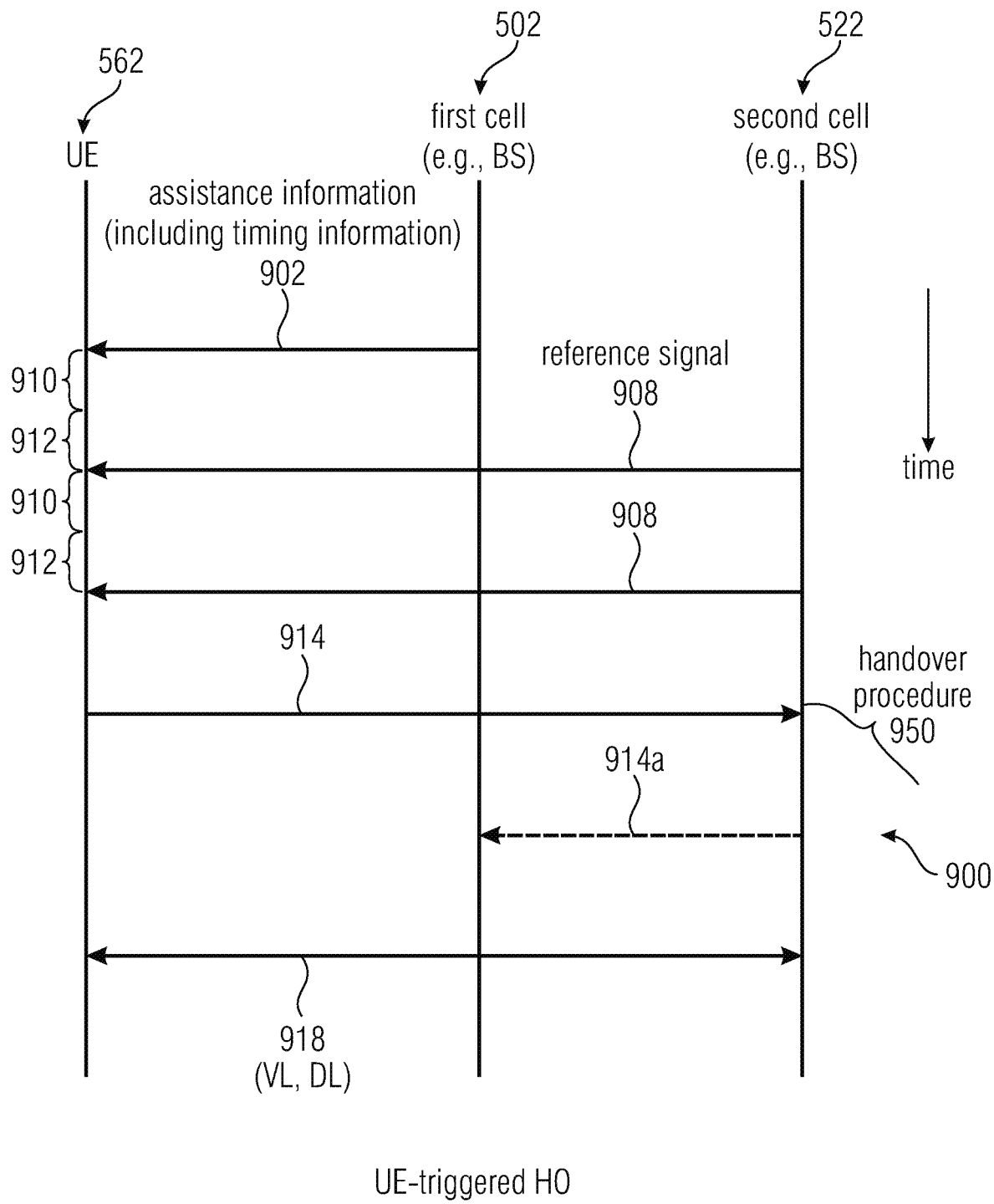
FIGS. 9 and 10 show communications according to examples.
Figure 10:
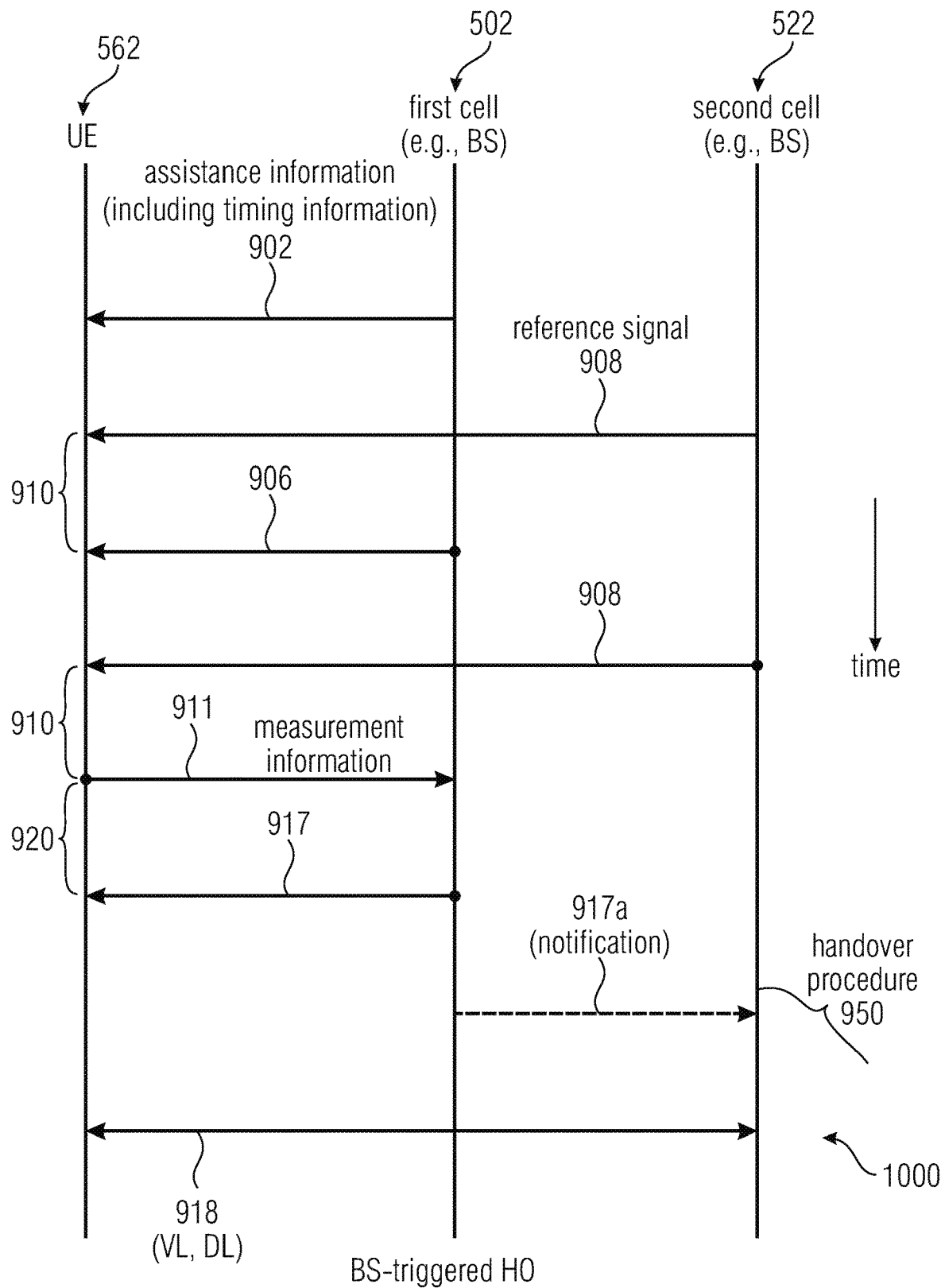

Reference can now be made to FIG. 8 in combination with FIG. 9 or 10, which show two different possible operations for the system of FIG. 8.

FIG. 8 shows a system including a first base station 502 (which may be a licensed or unlicensed base station, e.g., for NR-U), a second base station 522 (which may be an unlicensed base station, e.g., for NR-U), and a base station 542 (which may be a base station, e.g. operating on licensed spectrum, e.g., for LTE, 3G, 4G, 5G, etc.). Hereinafter, reference is made to "cells" instead of "base stations". Each cell may be operated by a base station. One base station may operate two different cells. Two different cells may be distinguished, for example, by the base station in case different cells are based on different base stations. Different cells may be based on different frequencies, different spaces, different directions, different codes, and/or different power.

A UE 562 may be connected, through a data link 571, with a first cell 502 (here associated to the first base station). The first cell 502 may be a licensed or unlicensed cell. The UE 562 may exchange, in an uplink or downlink, control signals (generally indicated with 570) with the first cell 502. As can be seen from FIG. 8, the UE 562 may potentially be connected to a second, unlicensed cell 522 (here associated to the second base station). In general terms, the UE 562 may potentially also communicate uplink or downlink data signals with the second cell 522, even though the UE 562 is currently operating by exchanging data signals 571 with the first cell 502. This situation generally occurs while the UE 562 is within a coverage area within which the UE 562 can receive/transmit signals from/to the cell 502. In the present example, the UE 562 happens to currently be in both the coverage area of the first cell 502 and in the coverage area of the second cell 522. The UE 562 may also happen to be within or without a coverage area associated to the licensed cell 542 (which may be, for example, a gNB/eNB). Therefore, in some examples the UE 562 may communicate with the licensed cell 542, which takes the role of the first cell. Therefore, the examples discussed below generally refer to the scenario of FIG. 8, even though the first cell may be undifferentiated embodied by the cell 502 and the cell 542 (as, in this scenario, it is indifferent whether the first cell is a licensed cell or unlicensed cell). In general terms, the UE 562 may send and/or receive data communications through signals 571 (e.g., signals regarding voice traffic and signals regarding data traffic, such as web-based signals transmitting web-based content).

The UE 562 may be configured to exchange control signals 570 with the first cell 502. As explained above, the UE 562 is currently exchanging data signals 571 and/or control signals 570 with the first cell 502, as a consequence of the fact that the conditions associated to the first cell 502 are held as being a better quality than the conditions associated to the communication with the second cell 522. Notwithstanding, the conditions may change, e.g., by virtue of one of several possible causes, such as traffic conditions, the UE 562 being moved towards a position more favorable for communicating the second cell 522, conditions associated to the capacities of the cell(s) 502 and/or 522 to satisfy the traffic request of the UE 562 and of possible other UEs, etc.

The UE 562 may exchange control signals 570 with the first cell 502. In particular, the UE 562 may receive, from the first cell 502, assistance information 902 (as part of the control signal 570) for assisting the UE 562 in receiving at least one discovery reference signal 908 (also indicated with 574). The assistance information 902, for example, may be a DMTC (discovery measurement time configuration). The at least one discovery reference signal (574, 908) may be in a time window, for example, within a DMTC period. The discovery reference signal (DRS) 908 may be used to discover, measure, and/or estimate the channel. The assistance information 902 can contain information about the time of the one or more DRS, such as periodicity, offset, time window, frequency information, periodicity, etc.

The at least one discovery reference signal 908 may be transmitted, for example, by a cell different from the first cell 502, e.g., the second cell 522 (e.g. a different base station). The assistance information 902 may therefore instruct the UE 562 regarding timing information on the discovery reference signal 908. The discovery reference signal 908 may be periodically sent by the second cell 522. It is here to be noted that, even though only one single discovery reference signal is here discussed, there is the possibility that a multiplicity of other, second cells send other discovery reference signals, each additional cell providing a particular discovery reference signal to the UE 562.

Figure 3:
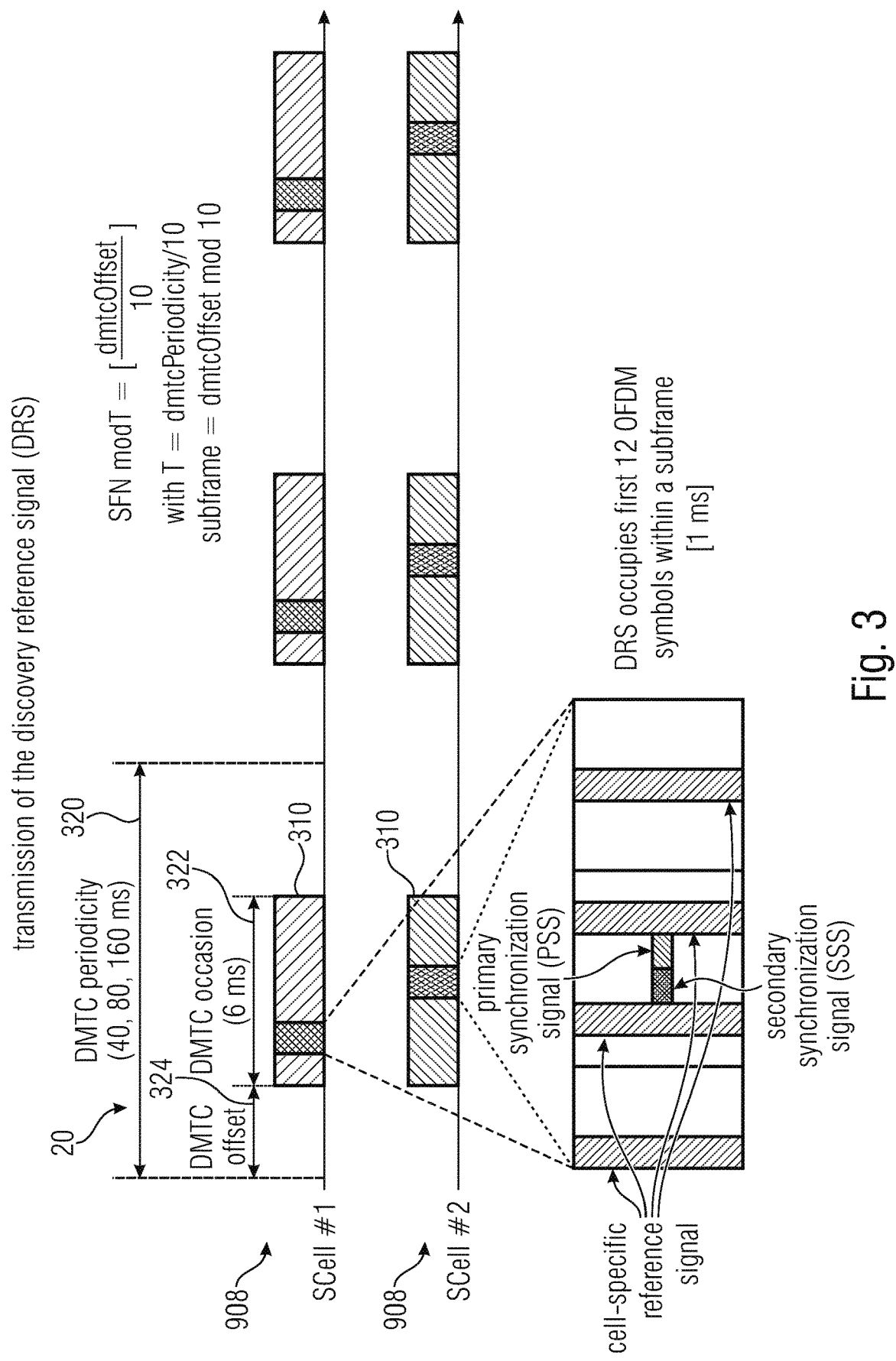

An example of the discovery reference signal 908 is shown in FIG. 3 and may be configured as a discovery reference signal (DRS). The discovery references signal 908 may be, for example, based on a discovery measurement time configuration (DMTC). Examples of these operations are discussed below. Anyway, the first cell transmits, encoded within the assistance information 902, information which permits the UE 562 to detect the discovery reference signal 908.

The UE 562 may perform measurement(s) on the discovery reference signal 908 as acquired by the UE 562. Accordingly, on the basis of the performed measurement(s), the UE 562 may obtain information associated to the (possible) communication with the first cell 522. E.g., on the basis of the discovery reference signal 908, the UE 562 may understand whether it is advantageous to handover to the second cell 522, for example.

This is particularly appropriate when the UE 562 is moved from the coverage area of the first cell towards a coverage area of the second cell 522, as the UE 562 may discover, for example, that the signal transmitted from the first cell 522 has an increased strength or an increase quality with respect to the signal from the first cell 502.

Accordingly, the UE 562 may perform a handover, HO, procedure 950 so that, subsequently, the UE 562 will exchange data signal 571 (in uplink and/or in downlink) and/or control signals (in downlink and/or in uplink) with the second cell 522 instead of the first cell 502.

The decision of triggering the handover procedure (which are herewith explained as HO decision and HO procedure 950) may be triggered either by the UE 562 and/or by the cell (e.g., BS) 502 and/or 522.

Examples are here provided. A first example is provided by FIG. 9, associated to the UE 562 autonomously deciding of performing a HO procedure. FIG. 9 shows the UE 562, a first cell 502 (which notwithstanding could also be the first cell 542) and a second cell 522. The communication is originally as in FIG. 8. The UE 562 is originally communicating in uplink and/or downlink data signal (for data and/or voice traffic) 571 and/or control signals 570 with the first cell 502 (this is not shown in FIG. 9). Among the control signals 570 received from the first cell 502, the UE 562 may receive assistance information 902 which assists the UE 562 to receive the discovery reference signal 908 from at least one second cell 522. In particular, encoded in the assistance information 902, there may be provided timing information regarding the discovery reference signal 908. Accordingly, the UE 562 obtains the knowledge of the discovery reference signal 908 to be received from the second cell 522 (e.g., timing of the discovery reference signal 908 and other information that permits the UE to receive the discovery reference signal 908). It is to be understood that, in cases, a plurality of second cells may be implemented, each sending its own discovery reference signal. The assistance information 902 in general provides information on all the discovery reference signals 908 transmitted by second cells with which the UE 562 may communicate (in examples, discovery reference signals 908 is only transmitted by unlicensed cells, while licensed cells, such as NR/LTE, do not necessarily make use of discovery reference signals).

The different discovery reference signals sent by the different cells may be transmitted in non-simultaneous time slots, the different cells being synchronized with each other, e.g., through a non-shown backhaul network. An example is provided by FIG. 3, where different cells send different discovery signals. The different base stations and/or different cells transmitting the different reference signals may, for example, be synchronized with each other, e.g., through a backhaul network (here not shown), for mobile communications. The timing information may relate, for example, to the periodicity of the reference signal (as indicated with 320 in FIG. 3), the offset 324 and the length of a measurement window. Different cells may in general be awarded of different slots during time, so that the UE 562 may recognize the discovery reference signals 908 from different cells and to distinguish between them.

The UE 562 may perform measurement(s) on the discovery reference signal 908 obtained from the second cell 522. The measurement(s) may be obtained, for example, by applying a RSSI technique. The measurement(s) may regard the strength of the received signal. The measurement may relate to the noise of the signal. The measurement(s) may relate to SNR (signal to noise ratio) and/or SNIR (Signal to noise+interference ratio). The measurement(s) may relate to correlation properties of the signal. Reference numeral 910 in FIG. 9 shows the time lost by the UE 562 in performing the measurement(s) on the discovery reference signal 908.

On the basis of the performed measurement(s), the UE 562 may perform the HO decision 912 (i.e., whether to initiate a HO procedure). The HO decision 912 may take into account the measurement(s) performed at 910. For example, if the strength or power of the discovery reference signal 908 is detected as being higher than the strength or power of the signals from the first cell 502, the UE 562 may decide, e.g., autonomously, to handover to the second cell 522, by virtue of the strength or power of the discovery reference signal 908 from the second cell 522 being greater than the strength or power of the signals from the first cell 502. If the decision has a negative result, the HO procedure is not initiated (e.g., by virtue of the strength or power of the discovery reference signal 908 from the second cell 522 being lower than the strength or power of the signal from the first cell 502). If the decision has positive result, the UE 562 may decide (e.g., autonomously) to initiate a handover procedure 950, e.g., by virtue of the increased strength or power of the signal from the second cell 522, as determined from the measurement(s) on the discovery reference signal 908 in respect to the signals from the first cell 502.

At the positive HO decision 912, the UE 562 may send a notification 914 to at least one of the first cell 502 and second cell 522 (while FIG. 9 shows that the communication is sent to the second cell 522, the notification 914 may be in addition or an alternative sent to the first cell 502). At the reception of the notification 914, the first cell 502 and/or second cell 522 obtains the knowledge that the HO procedure 950 is to be initiated. As shown by FIG. 9, the second cell 522 may notify, through a notification 914a, the HO decision 912 to the first cell 502, e.g. through the non-shown backhaul network.

Accordingly, a handover procedure 950 is started which will imply the fact that the UE 562 will communicate in the future with the second cell 522 instead of the first cell 502. Subsequently, normal UL or DL communications 918 (data or control) may be performed between the UE 562 and the second cell 522 (the control communication between the UE 562 and the second cell 522 for permitting the handover is here not shown, apart for the notifications 914 and 914a).

FIG. 10 shows an alternative example 1000 in which it is the cell 522 (e.g. the BS) which decides to trigger the handover, HO, 950.

Also in this case, the UE 562 is originally exchanging data with the first cell 502 as in FIG. 8. As explained above, the first cell 502 may transmit assistance information 902 including timing information (the assistance information and the time information may have the same features of those discussed above, and may be, for example, included in Radio Resource Control, RRC, Signalling). In the timing information encoded in the assistance information 902, the timing for the discovery reference signal 908 from the second cell 522 (even though a plurality of second cells may be provided) is provided to the UE 562. The UE 562 may perform measurement(s) on the discovery reference signal 908. The discovery reference signal 908 may have the same features of the discovery reference signal 908 discussed above. The measurement(s) may have the same features of the measurement(s) discussed above.

As can be seen from FIG. 10, the UE 562, in this example, does not autonomously decide whether to initiate or not initiate a HO procedure 950. As can be seen, the reference numeral 912 is missing in FIG. 10. Notwithstanding, the UE 562 may transmit measurement information 911 (e.g. in a measurement report) providing information regarding the measurement(s) performed at 910. The measurement report 911 may be transmitted either periodically (e.g. whatever the value of the obtained measurement(s)) or at the reaching of a particular event. One event may be, for example, the performed measurement(s) being over a measurement threshold indicative of a comparatively higher quality. Therefore, if the quality of the signal is high in the second cell, the first or second cell 502 or 522 may decide (at 920) to initiate the handover 950. The threshold may be in some cases static (e.g. based on a particular value which does not vary) or dynamic (e.g. based on a comparison between the strength or power of the signal sent by the first cell 502 with the strength or power of the discovery reference signal 908 sent by the second cell 522).

In general terms, when, from the measurement information 911, the cell 502 or 522 understands that the communication with the second cell 522 is advantageous, the cell may trigger the HO 950. It is to be noted that the measurement information 911 may be sent, in an additional alternative, to the second cell 522. The HO decision 920 may therefore be performed by the second cell 522. The first and second cells 502 and 522 may communicate with each other, for example, through a backhaul network not shown. The handover procedure 950 may be initiated though a notification 917 sent by the first cell 502 to the UE 562, while a notification 917a from the first cell 502 to the second cell 522 may permit to notify the HO decision of starting the HO procedure 950. The notification 917a may be transmitted, for example, through the backhaul network. After that, additional control communication (which is here not shown) may be exchanged between the UE 562 and the second cell 522, within the HO procedure 950.

In examples like the above and/or below, after the handover procedure 950 is performed, the communication may continue, even though between the UE 562 and the second cell 522. At this point, the roles of the first and second cells are inverted with each other. For example, while communicating in UL and/or DL with the UE 562, the second cell 522 may send the assistance information 902 including time information relating to the discovery reference signal 908 transmitted by the first cell 502.

In the examples above and/or below, therefore, the HO decision may be performed either by the UE 562 (HO decision 912) and/or by the first cell 502 (and/or by the second cell 522) (in this case, it is referred to HO decision 920). Notwithstanding, the HO decision is based on the measurement(s) performed by the UE 562 of the discovery reference signal 908 sent by the second cell 522 (and/or by other second cells here not shown). In general terms, the HO decision 912 or 920 may be based on measurement value(s) being over a measurement threshold indicative of an increased quality. The HO decision 912, 920 may be based at least on the status of the communication between the UE 562 and the first cell 502 and/or the occupancy of the first cell 502 and at least one second cell 522, so that the HO decision 912 or 920 may be based on the status associated to a better quality offered by at least one second cell 522.

In examples, the HO decision 912 or 920 may involve a choice between a plurality of second cells, wherein the choice is based at least on the performed measurement(s) (at 910) on the multiple discovery reference signals 908 (as acquired by the UE 562) from the plurality of second cells, and/or on the status of the second cell 522, so as to choose a second cell associated to an increased quality (e.g., the best quality). Therefore, in case of a plurality of second cells, the HO decision 912 or 920 will choose that cell that permits to maximize the quality of the communication and/or minimize and/or balance the network occupancy.

In examples above, the decision 912 or 920 is performed after the measurement(s). However, in some alternative examples, the measurement(s) may be performed after the HO decision. The HO decision may be based, for example, on a selection (e.g., user selection). The HO decision may be, for example, based on information regarding the status of the network (e.g. the occupancy of the network). For example, the first cell or second cell may decide the HO to the second cell 522 when the conditions of the network do not permit a satisfactory data or voice transmission between the UE 562 and the first cell 502. For example, if the second cell 522 is not occupied while the first cell 502 is occupied, the cell 502 and/or 522 may decide the HO autonomously, without taking into account measurement information. However, after having notified the decision (at 917) to the UE 562, the UE 562 will have to perform a measurement(s) on the discovery reference signal 908 from the second cell 522 on the basis of the timing information encoded in the assistance information 902.

Alternatively, the UE 562 may decide the handover autonomously, even without having performed the measurement(s). For example, the UE 562 may autonomously decide to the handover after having experienced bad conditions of the channel for the communication 571 with the first cell 502. For example, the UE 562 may have experienced a high latency times for the communication 571 or 570 with a first cell 502. Accordingly, the UE 562 may autonomously decide to initiate the HO procedure 950 even without having measured the discovery reference signal 908. Notwithstanding, after the HO decision 912 (e.g., after and/or before the notification 914) the UE 562 may perform the measurement(s) on the discovery reference signal 908 on the basis of the timing information encoded in the assistance information 902.

Figure 5:
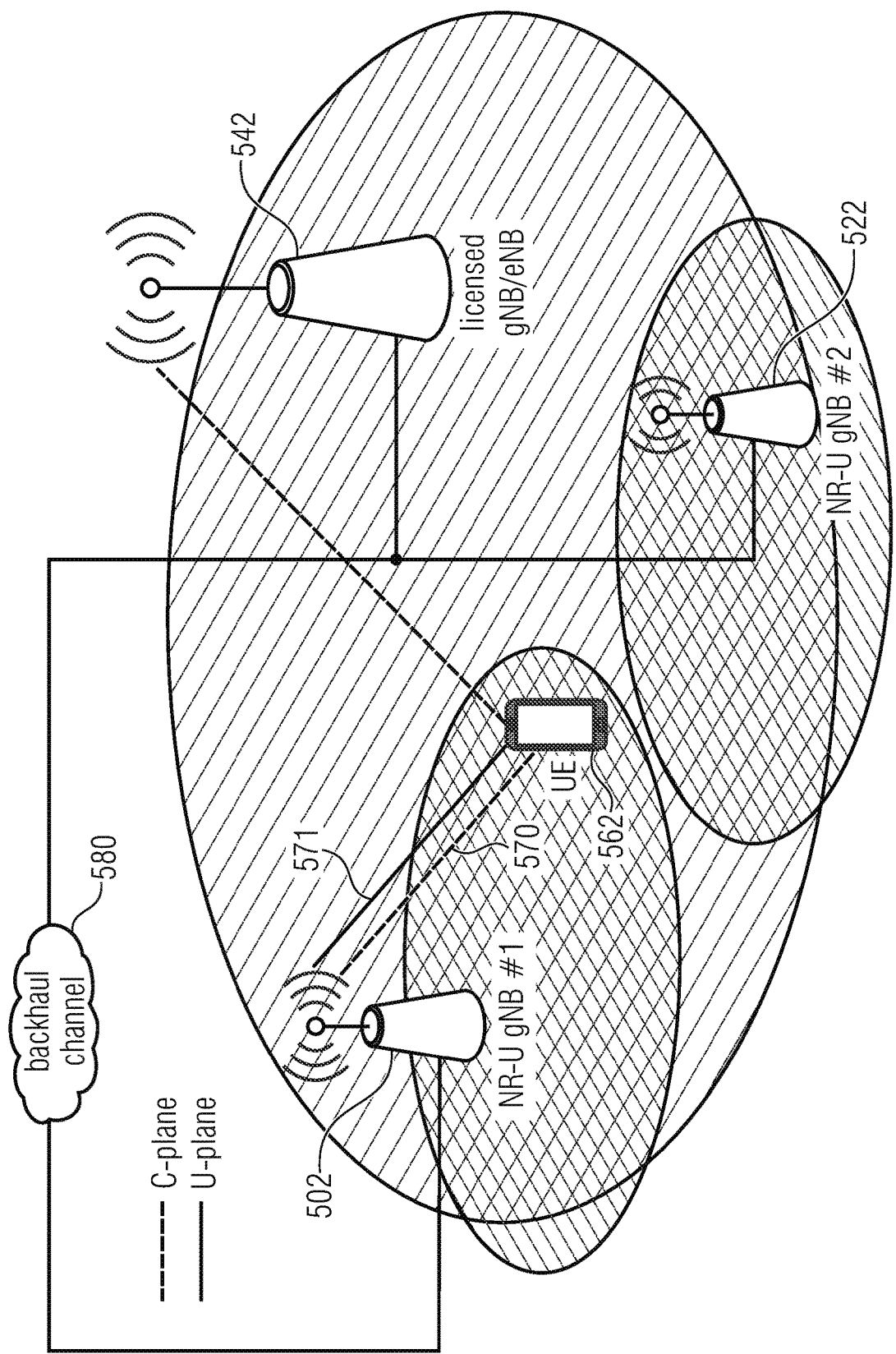
FIGS. 5 and 6 show a system according to an example.
Figure 6:
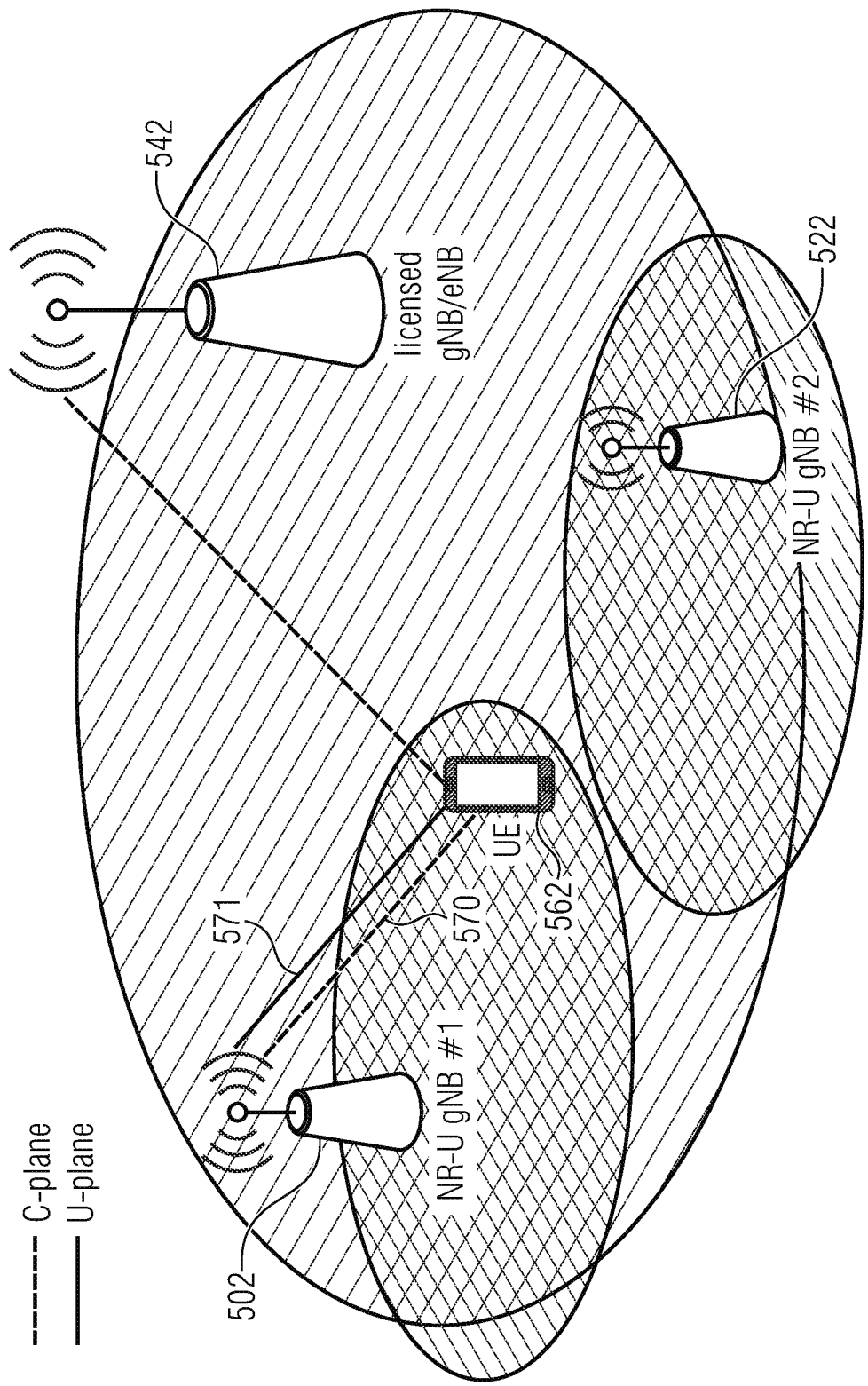
Figure 7:
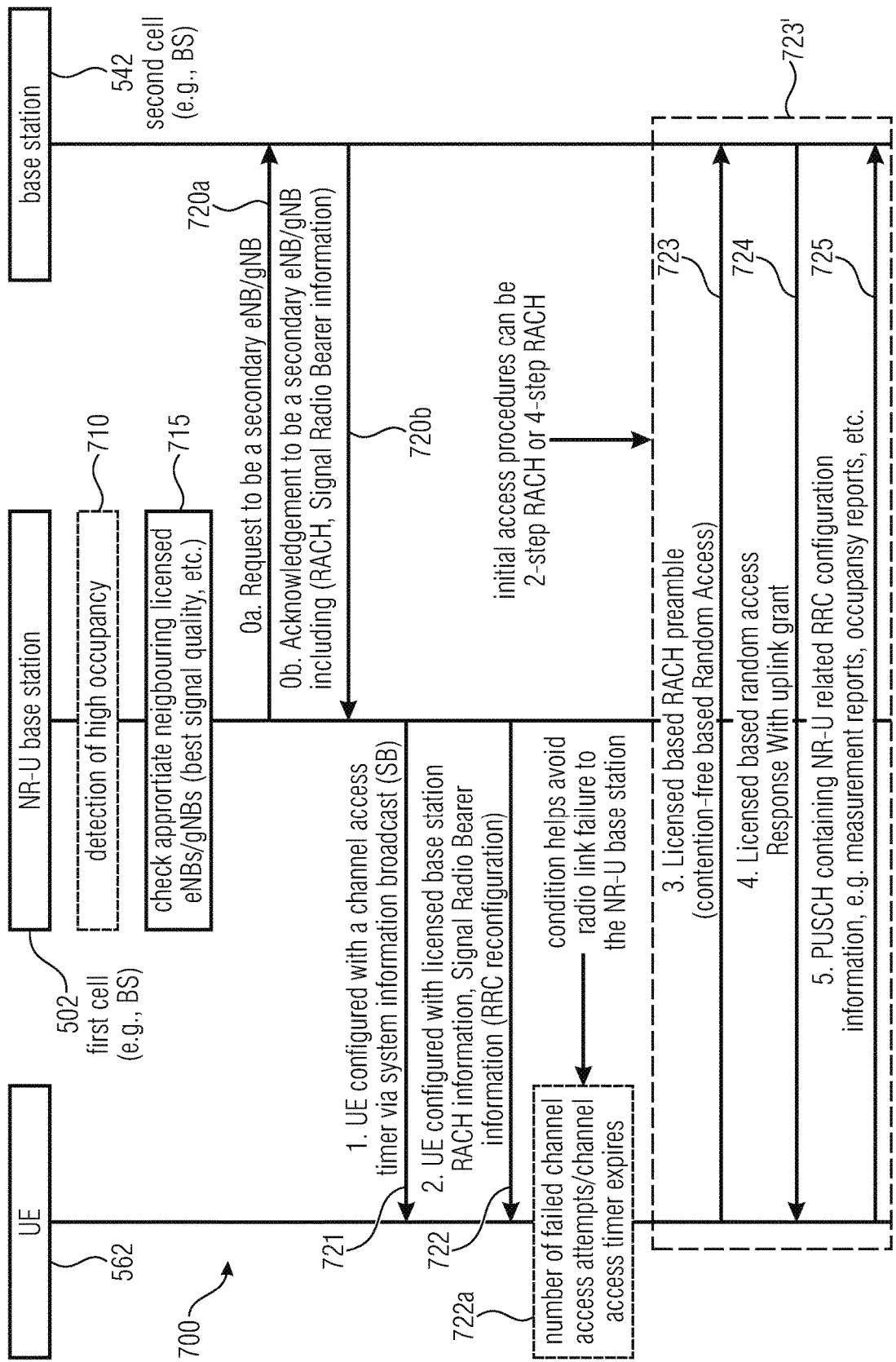
FIG. 7 shows a communication according to an example.

Reference can now be made to FIGS. 5-7, which refer to a different scenario. FIGS. 5-7 shows a scenario of a UE 562 (which may be the UE above and/or below) which is within a coverage area of a first cell 502 (e.g. BS) which is an unlicensed cell, while the UE 562 is currently also within the coverage area of a second cell 542 (which in this case is a licensed cell, but in other examples could be an unlicensed cell). An unlicensed cell 522 is also shown which could have the same role of the licensed cell 542. That would have in case the UE 562 were moved in an area which is both covered by the first cell 502 and by the second cell 522. The examples herewith below are notwithstanding disclosed without taking into account the cell 522, even though it is to be understood that the second cell 522 may substitute the cell 542 in a variance.

While FIG. 5 shows a backhaul channel 580 (e.g. backhaul network) and FIG. 6 does not, it shall be understood that FIG. 6 also has the backhaul channel 580. In other examples, are different systems without the backhaul channel 580 that may be used. In general terms, some examples below are discussed by starting with a scenario of FIG. 5 and moved towards the scenario of FIG. 6.

As can be seen, in the configuration of FIG. 5, the UE 562 is exchanging data through the communication data channel 571 in uplink and/or downlink (e.g. voice traffic and/or data traffic), e.g., in single connectivity (no dual connectivity). Also control signals 570 are exchanged by the UE 562 with the first cell 502. It will be shown that a dual connectivity (or more in general multiple connectivity or multi-connectivity) may be initiated so that the UE 562 simultaneously communicates with both the first cell 502 (through the communication control signals 570) and the second cell 542 (control signals 572). The UE 562 may be configured to exchange control signals 570, in uplink and/or downlink, with the first cell 502 and at least one second cell 522 and 542. The UE 562 may be configured to exchange data transmissions, e.g. for voice and/or data traffic, in uplink and/or downlink, with the first cell 502 and at least one second cell 522 and 542. The first cell 502 is an unlicensed cell and the at least one second cell 522 and 542 is a licensed or an unlicensed cell.

The UE 562 may be configured to perform, with the first cell 502, an uplink and/or downlink communication to a listen before talk, LBT medium access strategy. The UE 562 may receive configuration data from the first cell 502 in case of fulfilment of a predetermined pre-condition for initiating the connectivity procedure (the pre-condition may be for example associated to the detection of high occupancy of the communication link between the UE 562 and the first cell 502). The configuration data may include access information of the dual connectivity procedure to be established. The configuration data may indicate the selected second cell (e.g. whether the cell 542 or the cell 522 is chosen). After the reception of the configuration data, the UE 562 may evaluate a condition (e.g., a link deterioration condition) associated to the access of the communication with the first cell 502. In case of fulfilment of the condition (e.g., indicating a comparatively high link deterioration), the UE 562 may start the dual connectivity procedure with the selected second cell.

Therefore, a double condition may be checked:
 1. Pre-condition, evaluated by the first cell 502, to check the status of the communication (e.g. high occupancy or service requirement or UE mobility); and 2. A second, final condition, determined by the UE 562 after having recognized a poor quality of the communication with the first cell 502.

Only after the fulfilment of the second of the two conditions, the UE 562 will start the multi connectivity with the first and the second cells 502 and 542.

An example of the two-condition criteria is provided by FIG. 7. At step 710, the first cell may detect the pre-condition (e.g. high occupancy of the communication). At step 715, the first cell 502 may check (e.g. through the backhaul channel 580) whether a neighboring cell (e.g. a licensed cell) is present. At step 720a, the first cell 502 may request, to the second cell 542, whether the second cell 542 may accept the dual connectivity (this communication may be performed through the backhaul channel 580, for example). At step 720b, the second cell 542 may notify (e.g., through the backhaul channel 580) to the first cell 502 an acknowledgement or non-acknowledgement to operate multi connectivity (e.g. to become a secondary cell for the multi connectivity). In case of positive acknowledgement, the first cell 502 may transmit (at 721) configuration data including access of information for the dual connectivity procedure. The configuration data may indicate which is the selected second cell (which is in this case the cell 542, but it would be possible that the second cell is chosen between a multiplicity of cells).

At step 723, the UE 562 may send configuration information. At 722a, the UE 562 may evaluate the condition (e.g., link deterioration condition). In case of high link deterioration, the UE 562 will actually start the dual connectivity procedure 723' (which may include at least one of the steps 723, 724 and 725, for example). Therefore, by performing a procedure 723', the UE 562 may start operating in dual connectivity with both the cells 502 and 542, using a multi-connectivity channel divided between the channels 570 with the first cell 502 and the channel 572 with the second cell 542.

In general terms, the initiation of the dual connectivity is evaluated on two conditions. The first (pre-)condition is evaluated by the first cell 502 (or by the second cell, or by the network, more in general), which may take into consideration the general status of the communication. The second, final, condition is evaluated by the UE 562, which actually starts the dual connectivity procedure for example only at the determination of an effective, high deterioration of the network. In some cases, it may be understood that both the first cell 502 (for evaluating the pre-condition) and the UE 562 (for evaluating the final, link deterioration condition) evaluate the status, link deterioration conditions, and/or for measurement(s) on the signals and/or the latency of the transmissions. Notwithstanding, in examples, the determination of the pre-condition is based on a threshold which is associated to a less deteriorated communication channel than the condition evaluated by the UE 562. Therefore, the pre-condition evaluated by the first cell 502 may be associated to a status from which a high link deterioration is foreseeable, even though not necessarily present yet. Hence, the pre-condition may be in general verified before the real necessity of the dual connectivity, but permits to alert and/or configure the UE 562, so that the UE 562 prepares for the dual connectivity. The UE 562 will actually start the dual connectivity after determined the fulfilment of the condition, for example a threshold of the link deterioration is met, so as to initiate the dual connectivity procedure only when effectively needed.

In examples, the pre-condition may be dependent on the services/QoS requested by the UE or a network entity.

Some examples are here provided:

Both the pre-condition and the final condition may be conditions on the strength or power of the signals. The pre-condition may evaluate the strength or power according to a first threshold, and the final condition may evaluate the strength or power according to a second threshold. The second threshold may be associated to a lower performance (more deteriorated conditions) than the first threshold: hence, when the first threshold is reached (pre-condition), the UE 562 is alerted, so that the UE 562 prepares for the dual connectivity, but the UE will initiate the dual connectivity only when the final condition (strength or power of the signal) is lower than the second threshold.

Both the pre-condition and the final condition may be conditions associated to error rate (e.g., using redundancy cyclical code, RCC, techniques). The pre-condition may evaluate the error rate according to a first threshold, and the final condition may evaluate the error rate according to a second threshold. The second threshold is associated to a lower performance (more deteriorated conditions) than the first threshold: hence, when the first error-rate threshold is reached (pre-condition), the UE 562 is alerted, so that the UE 562 prepares for the dual connectivity, but the UE will initiate the dual connectivity only when the final condition (error rate) is higher than the second, higher threshold.

The pre-condition and the final condition may be conditions associated to LBT failures (e.g., failures to get the access to the channel, e.g., by virtue of the channel being occupied by another UE). The pre-condition may be associated to a high occupancy of the channel (e.g., over a first threshold), and the second, final condition may be associated to a high number of LBT failures (e.g., over a second threshold). The second condition may be in general stricter than the first condition (e.g., associated to a higher occupancy than the first threshold).

In addition or alternative, different choices may be made. For example, the pre-condition is based on a selection. The selection could be, for example, a user selection. The selection can be based on at least one of the following aspects; a number of LBT failures, high cell utilization, channel quality or quality of service, QOS, requirements.

In addition or alternative, the pre-condition may be based on the status of the first cell. The pre-condition may be at least on: an occupancy status of the at least one of the plurality of cells different from the first cell, measurement(s) performed by the first cell, measurement(s) performed by the UE 562 and signaled to the first cell 502, measurement(s) performed by the at least one second cell and signaled to the first cell 502 through a backhaul link 580, measurement(s) on interference, or metrics associated to the failures in accessing the communication between the UE and the first cell.

Also the final condition (as evaluated by the UE 562) may be based on several aspects. The condition may be at least based on a metrics associated to failed accesses, by the UE 562, to the communication with the first cell, the configuration data provided by the first cell 562, or a maximum number of failed accesses expiration of a maximum access timer.

In examples, the condition may be a link deterioration condition: it may be fulfilled when a comparatively high link deterioration is determined. The condition may be associated to the number of LBT failures: it may be fulfilled at the determination that a comparatively higher number of LBT failures has occurred. The condition may be associated to the number of packet losses: it may be fulfilled when the number of packet losses is over a threshold. The condition may be associated to the quality of service and/or service requirements: it may be fulfilled when the quality of service cannot be guaranteed anymore. The condition may be associated to the channel occupancy: it may be fulfilled when the channel occupancy is over a threshold.

In some cases, it is possible to arrive at preparing other configurations for the dual connectivity before the real necessity of starting the dual connectivity communication. This is extremely advantageous, as it permits to start the dual connectivity communication as soon as there is the real necessity, after that both the second cell and the UE 562 are configured for performing the dual connectivity. Accordingly, the procedure for starting a dual connectivity is sped up.

Instruments

Listen-Before-Talk (LBT) Mechanisms:

With LBT, a UE starts sending a transmission after having detected that a particular resource (e.g., channel) is not occupied by other transmissions in a current time slot.

There are two LBT mechanisms standardized by ETSI (European Telecommunications Standards Institute) to adaptively access a channel in order to avoid concurrent transmissions from other devices.

Figure 1:
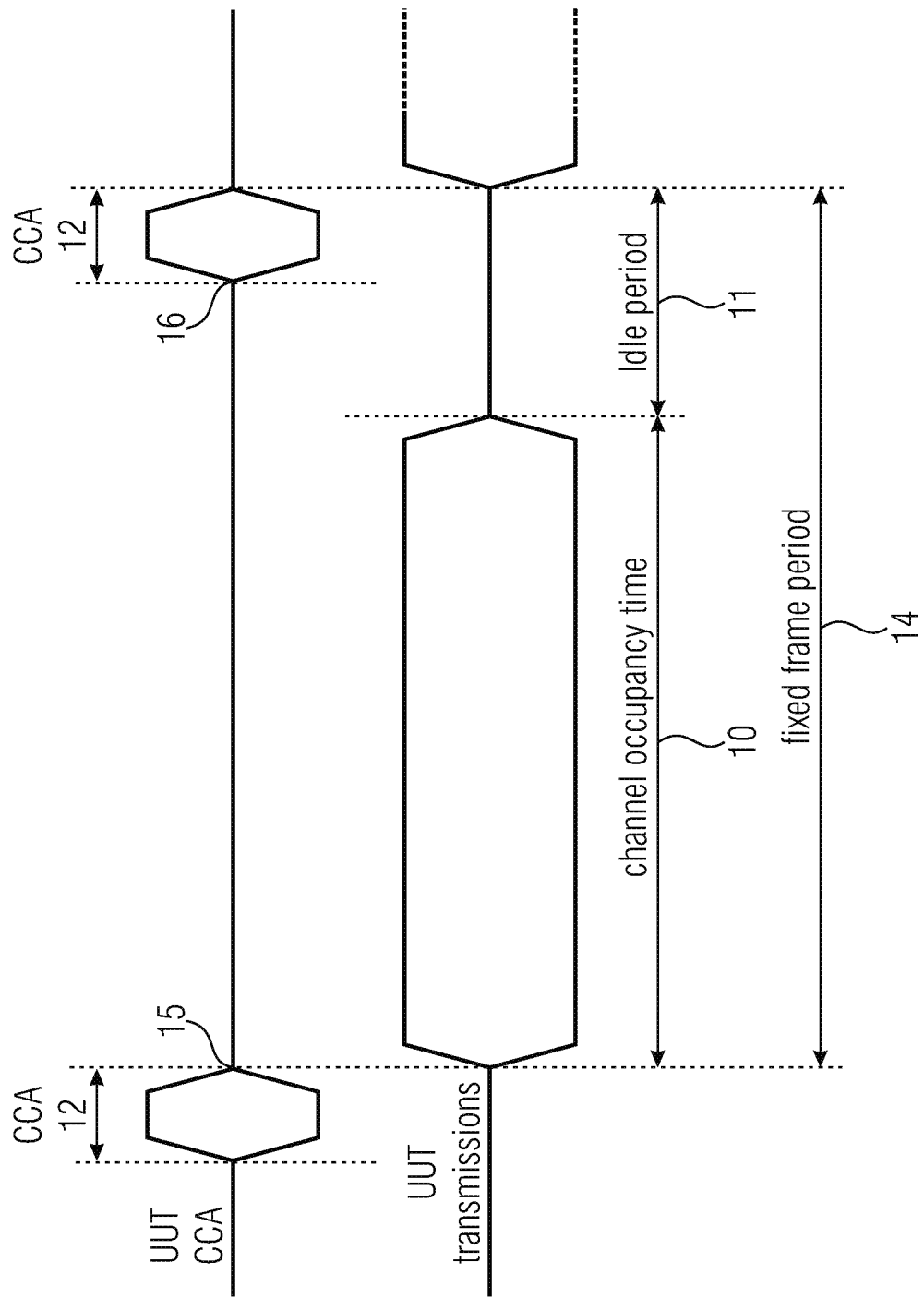
FIG. 1 shows a technique that may be implemented with an example.

1) Frame based Equipment (FBE) (which may be the cell or the UE) has to perform a Clear Channel Assessment (CCA) 12 using energy detection (ED) prior to starting a transmission. FBE observes the channel for a fixed time period 12 which may be at least 20 µs (other times are possible), for example. The mechanism is depicted in FIG. 1. A channel is declared occupied if the measured power level exceeds a defined threshold after the CCA 12. Basically, the power of another transmission is measured at CCA 12 by the UE and, if the power is over the threshold, the UE considers that the channel is occupied, e.g., at instant 15. If the channel is occupied, CCA is performed again to access the channel after the fixed frame period 14. If it has been found to be clear then (e.g., at instant 15), the FBE device is clear to transmit, otherwise if it has been observed to be occupied the FBE device shall not transmit. The channel occupancy time (COT) 10 is defined as the total time during which a UE has not re-evaluated the availability of the channel. The COT 10 may correspond to a range between 1 ms to 10 ms and the minimum IDLE period (also referred to as a defer period) 11 may be at least 5% of the COT 10 used by the FBE for the current frame period 14. The ED threshold is directly proportional to the maximum transmit power of the device occupying the channel [1].

2) Load based equipment (LBE) also uses CCA using ED to transmit on an operating channel. LBE makes use of an extended CCA (eCCA) check where the operating channel is observed for a duration of a random N factor multiplied by the CCA observation time. N defines the number of clear idle slots (ranging from 1 to q) resulting in a total Idle period that is needed before the start of the transmission. The value is q may be defined by the manufacturer to be between 4 to 32. The total time that a device makes use of an operating channel is the maximum COT (MCOT) which should be less than ((13/32)×q) ms. The ED threshold is also directly proportional to the maximum transmit power of the device as in the FBE case [1].

It can be noted that FBE has simpler channel access mechanisms, when compared to LBE.

3GPP has defined 4 categories of LBT for LAA and NR-based access for unlicensed spectrum [2, 3]:

CAT 1: No LBT mechanism within a COT. This is used for a transmitter to immediately transmit after a switching gap inside a COT. The switching gap from reception to transmission is to accommodate the transceiver turnaround time and is no longer than 16 µs.

CAT 2: LBT without random back off, where the duration of time that the channel is sensed to be idle before the transmitting entity starts a transmission is deterministic.

CAT 3: LBT with random back off with fixed size contention window. The transmitting entity selects a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel CAT 4: LBT with random back off with variable size contention window. The transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

One of these instruments may be used for the techniques above and/or below.

Measurement Configurations

Discovery Measurement Time Configuration (DMTC)

Figure 2:
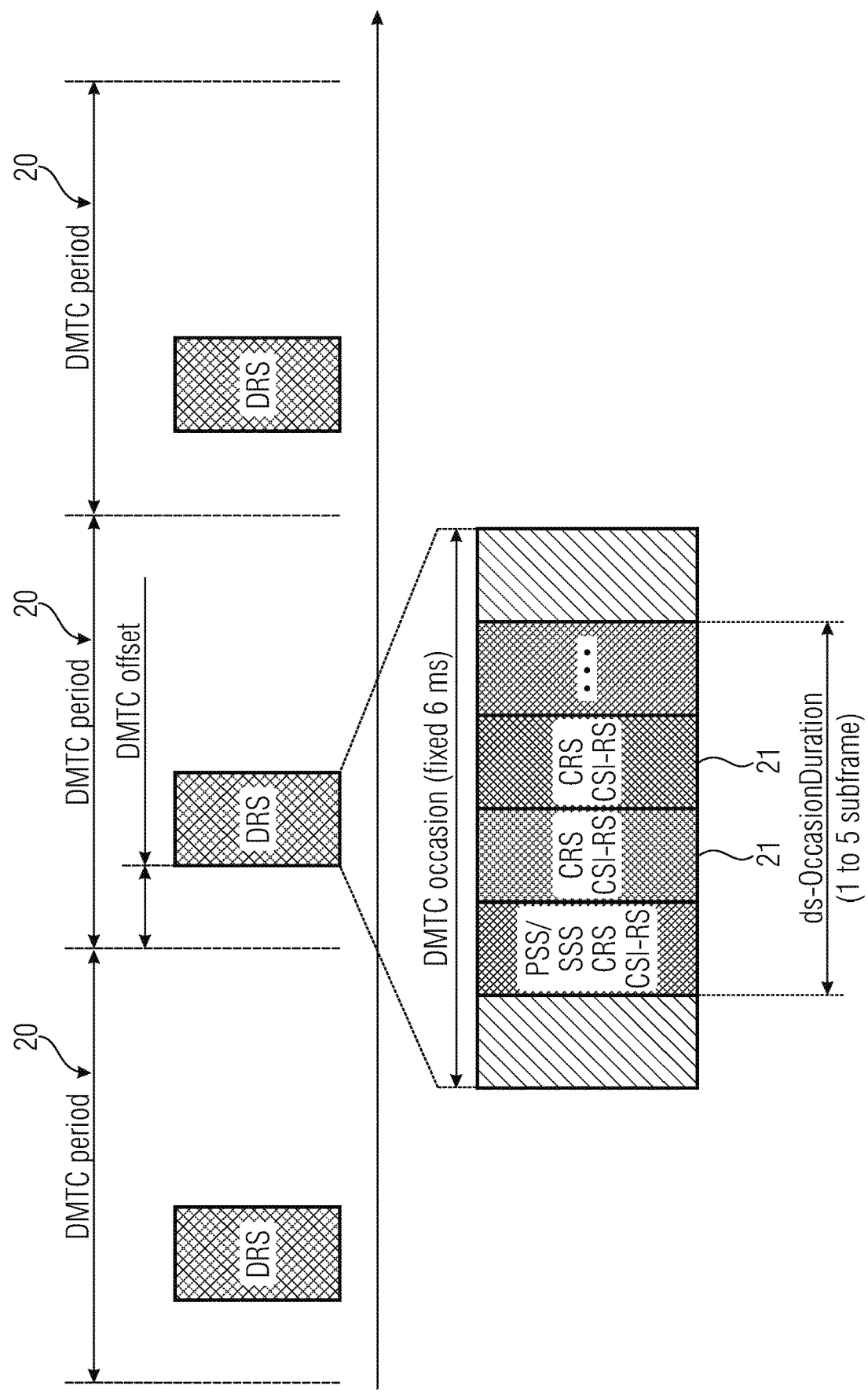
FIGS. 2 and 3 illustrate a Discovery Measurement Time Configuration (DMTC) according to an example.

This technique makes use of specific time domain measurement windows, where the UE is allowed to perform measurements, e.g. Radio Link Monitoring (RLM). FIGS. 2 and 3 shows the structure of a DMTC window 20, where a period and subframe offset parameter are configured. This may enable for example the cell to dynamically toggle 'on' and 'off' states.

The UE is configured with these parameters for example via Radio Resource Control (RRC) Signalling, so as to permit the UE to recognize the reference signal to be measured.

Therefore, the UE may measure the reference signal (e.g., PSS, SSS, CRS, CSI-RS, DRS) 21 after having known, from the RRC Signalling, configuration data of the DMTC window 20.

RSSI Measurement Time Configuration (RMTC)

A technique used by a base station for measuring the power of the signals from the UE(s) is here indicated.

Figure 4:
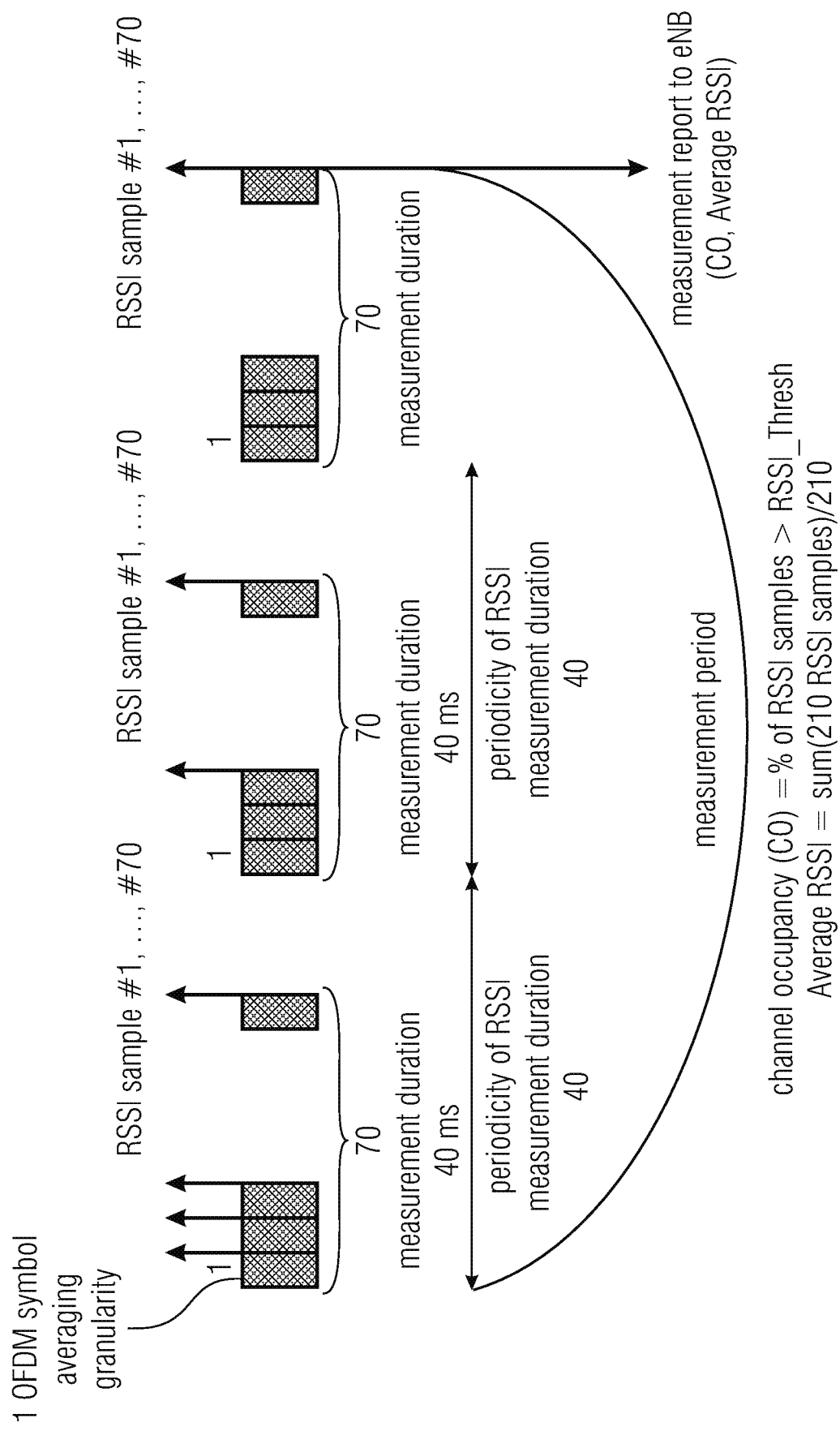
FIG. 4 illustrates an RMTC procedure according to an example.

In the case of Radio Resource Management, it may be beneficial for the base station to be able to understand the channel occupancy status or load of the carrier, e.g., to avoid the hidden node problem by correlating measurements by multiple UEs. The RMTC indicates the percentage of time, that RSSI was observed to be above a configured threshold for RRM reports. FIG. 4 illustrates the RMTC procedure.

The RMTC period 40 and offset may for example also be configured via RRC signalling (e.g., from the BS), so that the UE knows at which instants to perform the measurements. The RMTC is dependent on the on the measurements performed during the DMTC (RSRP and RSRQ).

Discussion

A discussion on aspects of the invention is here presented.

Cell-Triggered (e.g., BS-Triggered) Handover (HO) Measurement Configuration (E.g., FIG. 10)

The first cell (e.g., NR-U gNB/licensed gNB) 502 may provide the UE 562 with a measurement configuration (e.g., the assistance information 902 of FIG. 10) via e.g. RRC signalling (e.g., 20 in FIGS. 2 and 3) including partial or full DMTC configurations of neighboring cells (e.g., 522 and/or 542). The measurement configuration, defining a HO measurement occasion, may include at least one of:

- measurement periodicity, such as 320 (e.g., a multiple of the DMTC periodicity)
- measurement window, such as 322 (might be larger than the DMTC occasion)
- DMTC offsets, such as 324 and frequency information of neighboring cells For NR the DRS can be assumed to include a combination of both SS/PBCH (Synchronization Signal Block) blocks and CSI-RS (channel state information reference signal), for example.

The following exemplary message defines the specifies information applicable for SS/PBCH block(s) intra/inter-frequency measurements or CSI-RS intra/inter-frequency measurements.

SSB-MTC Information Element (e.g., 902 in FIG. 10)

```
-- ASN1START
-- TAG-SSB-MTC-START
SSB-MTC ::=                      SEQUENCE {
    periodicityAndOffset              CHOICE {
        sf5                               INTEGER (0..4),
        sf10                              INTEGER (0..9),
        sf20                              INTEGER (0..19),
        sf40                              INTEGER (0..39),
        sf80                              INTEGER (0..79),
        sf160                             INTEGER (0..159)
    },
    duration                          ENUMERATED { sf1, sf2,
sf3, sf4, sf5 }
}
SSB-MTC2 ::=                     SEQUENCE {
    pci-List                         SEQUENCE (SIZE
(1..maxNrofPCIsPerSMTC)) OF PhysCellId
OPTIONAL, -- Need M
    periodicity                      ENUMERATED {sf5, sf10,
sf20, sf40, sf80, spare3, spare2, spare1}
}
Discovery-MTC ::=                SEQUENCE {
    DiscoveryperiodicityAndOffset       CHOICE {
        sf5                                 INTEGER (0..4),
        sf10                                INTEGER (0..9),
        sf20                                INTEGER (0..19),
        sf40                                INTEGER (0..39),
        sf80                                INTEGER (0..79),
        sf160                               INTEGER (0..159)
    },
    duration                            ENUMERATED { sf1, sf2,
sf3, sf4, sf5 }
}
Discovery-MTC2 ::=               SEQUENCE {
    pci-List                         SEQUENCE (SIZE
(1..maxNrofPCIsPerSMTC)) OF PhysCellId
OPTIONAL, -- Need M
    periodicity                      ENUMERATED {sf5, sf10,
sf20, sf40, sf80, spare3, spare2, spare1}
}
-- TAG-SSB-MTC-STOP
-- ASN1STOP
```

| Discovery-MTC field descriptions |
|---|
| duration |
| Duration of the measurement window in which to receive CSI-RS and SS/PBCH blocks. |
| It is given in number of subframes (see 38.213, section 4.1) |
| DiscoveryperiodicityAndOffset |
| Periodicity and offset of the measurement window in which to receive CSI-RS and SS/PBCH blocks. Periodicity and offset are given in number of subframes. |
| Periodicity for the given PCIs. Timing offset and Duration as provided in smtc1. |

| Discovery-MTC2 field descriptions |
|---|
| pci-List |
| PCIs that are known to follow this DMTC for NR-U |

The following exemplary measurement reporting message for triggering the event of handover based on the DRS of the neighbouring cells is shown for NR, ReportConfigNR. This may for example be initially transmitted via system information and then updated via RRC signalling transmitted from the cell 502 to the UE 562. Or it may simply be transmitted via RRC.

ReportConfigNR Information Element (e.g., 917 in FIG. 10)

```
-- ASN1START
-- TAG-REPORT-CONFIG-START
ReportConfigNR ::=              SEQUENCE {
    reportType                       CHOICE {
        periodical
PeriodicalReportConfig,
        eventTriggered
EventTriggerConfig,
        ...,
        reportCGI                        ReportCGI
    }
}
ReportCGI ::=                   SEQUENCE {
    cellForWhichToReportCGI         PhysCellId,
    ...
}
EventTriggerConfig::=           SEQUENCE {
    eventId                          CHOICE {
        eventA1                          SEQUENCE {
            a1-Threshold
MeasTriggerQuantity,
            reportOnLeave                    BOOLEAN,
            hysteresis
Hysteresis,
            timeToTrigger
TimeToTrigger
        },
        eventA2                          SEQUENCE {
            a2-Threshold
MeasTriggerQuantity,
            reportOnLeave                    BOOLEAN,
            hysteresis
Hysteresis,
            timeToTrigger
TimeToTrigger
        },
        eventA3                          SEQUENCE {
            a3-Offset
MeasTriggerQuantityOffset,
            reportOnLeave                    BOOLEAN,
            hysteresis
```

-continued

```
Hysteresis,
        timeToTrigger          TimeToTrigger,
        useWhiteCellList       BOOLEAN
    },
    eventA4                    SEQUENCE {
        a4-Threshold           MeasTriggerQuantity,
        reportOnLeave          BOOLEAN,
        hysteresis             Hysteresis,
        timeToTrigger          TimeToTrigger,
        useWhiteCellList       BOOLEAN
    },
    eventA5                    SEQUENCE {
        a5-Threshold1          MeasTriggerQuantity,
        a5-Threshold2          MeasTriggerQuantity,
        reportOnLeave          BOOLEAN,
        hysteresis             Hysteresis,
        timeToTrigger          TimeToTrigger,
        useWhiteCellList       BOOLEAN
    },
    eventA6                    SEQUENCE {
        a6-Offset              MeasTriggerQuantityOffset,
        reportOnLeave          BOOLEAN,
        hysteresis             Hysteresis,
        timeToTrigger          TimeToTrigger,
        useWhiteCellList       BOOLEAN
    },
    eventNR-U_HO               SEQUENCE
{
    NR-U-Offset                MeasTriggerQuantityOffset,
        reportOnLeave          BOOLEAN,
        hysteresis             Hysteresis,
        timeToTrigger          TimeToTrigger,
    },
    ...
    },
    rsType                     NR-RS-Type,
    reportInterval             ReportInterval,
    reportAmount               ENUMERATED {r1,
        r2, r4, r8, r16, r32, r64, infinity},
    reportQuantityCell         MeasReportQuantity,
    maxReportCells             INTEGER
        (1..maxCellReport),
    reportQuantityRsIndexes    MeasReportQuantity
        OPTIONAL,  -- Need R
    maxNrofRSIndexesToReport   INTEGER
        (1..maxNrofIndexesToReport)
        OPTIONAL,  -- Need R
    includeBeamMeasurements    BOOLEAN,
    reportAddNeighMeas         ENUMERATED {setup}
        OPTIONAL,  -- Need R
    ...
}
    ...
}
NR-RS-Type ::=                 ENUMERATED {ssb, csi-rs}
MeasTriggerQuantity ::=        CHOICE {
    rsrp                       RSRP-Range,
    rsrq                       RSRQ-Range,
    sinr                       SINR-Range
}
MeasTriggerQuantityOffset ::=  CHOICE {
    rsrp                       INTEGER (−30..30),
    rsrq                       INTEGER (−30..30),
    sinr                       INTEGER (−30..30)
}
MeasReportQuantity ::=         SEQUENCE {
    rsrp                       BOOLEAN,
    rsrq                       BOOLEAN,
    sinr                       BOOLEAN
}
-- TAG-REPORT-CONFIG-START
-- ASN1STOP
```

| EventTriggerConfig field descriptions |
|---|
| a3-Offset/a6-Offset/NR-U offset<br>Offset value(s) to be used in NR measurement report triggering condition for event a3/a6/NR-U offset. The actual value is field value * 0.5 dB.<br>aN-ThresholdM<br>Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5. For eventNR-U_HO is the event will trigger once the triggering condition is met, e.g. greater than RSRP/RSRQ/SINR of the measured reference symbol (RS) (e.g. SS/PBCH block, CSI-RS or Channel Busy Ratio indicating the channel occupancy).<br>eventId<br>Choice of NR event triggered reporting criteria.<br>maxNrofRsIndexesToReport<br>Max number of measurement information per RS index to include in the measurement report for A1-A6 events.<br>maxReportCells<br>Max number of non-serving cells to include in the measurement report.<br>reportAddNeighMeas<br>Indicates that the UE shall include the best neighbour cells per serving frequency.<br>reportAmount<br>Number of measurement reports applicable for eventTriggered as well as for periodical report types<br>reportOnLeave<br>Indicates whether or not the UE shall initiate the measurement reporting procedure when the leaving condition is met for a cell in cellsTriggeredList, as specified in 5.5.4.1.<br>reportQuantityCell |

| EventTriggerConfig field descriptions |
| --- |
| The cell measurement quantities to be included in the measurement report.
reportQuantityRsIndexes
Indicates which measurement information per RS index the UE shall include in the measurement report.
timeToTrigger
Time during which specific criteria for the event needs to be met in order to trigger a measurement report.
useWhiteCellList
Indicates whether only the cells included in the white-list of the associated measObject are applicable as specified in 5.5.4.1. |

The measurements can be configured to be event-triggered as shown above with a set of common key parameters (highlighted in bold), where the event is a possible handover.

These measurement profiles are applicable for both neighbouring intra-frequency (operating on same carrier frequency) and inter-frequency (operating on different carrier frequency) base stations. It may also be assumed that these serving and neighbouring base stations either:
- belong to a same PLMN (mobile network operator); or
- are synchronized; or
- are connected via an interface (e.g. X2, Xn) among each other for information exchange so that the serving cell can provide updated DMTC configurations of neighbouring cells to the UE.

Cell-Triggered HO:

The UE 562 may measure the reference signal 908 (e.g., DRS) of neighboring cell 542 only in the measurement occasion and reports the measurement outcome back to the BS 502. The measurement configuration (e.g., as provided by in the assistance information 902) may additionally include information regarding where and when to report the measurement outcome, e.g., the UE 562 tries to initiate a COT with a PUSCH including corresponding RRC signaling after a defined time period after each HO measurement occasion.

Another example of when to report the measurement could be an event-triggered approach, where the UE transmits a measurement report only after the measured neighbouring cell(s) exceed a reference threshold. This still depends on whether the UE successfully initiates a COT via LBT.

UE-Triggered HO (FIG. 9)

The UE 562 may use the measurement information as performed at 910 to decide at 912 whether another cell (e.g., 542) has a better link and may perform autonomously an initial access to this cell Additional triggers can be consistent LBT failures or high channel occupancy/load (CBR).

UE-Triggered Multi-RAT-Dual Connectivity

Scenario 1: Unsuccessful Channel Access after a period of time/Measurement Configuration not received within a specific time due to high occupancy of the unlicensed channel, resulting in consecutive LBT failures.

The UE 562 may operate in an NR-U standalone scenario, with both Control-plane (C-plane) and User-plane (U-plane) links (connections) to a NR-U base station 502 as noted in the exemplary FIG. 5.

The UE 562 may be configured with an NR-U channel access timer after which the NR-U base station 502 can trigger a fast-track C-plane split bearer connection (supported for SRB1 and SRB2) for the said UE 562 over a licensed carrier to the strongest neighbouring base station (e.g., 542) based on a set of criteria (low load, best signal quality, etc.), in order to provide robust control signalling for the NR-U UE 562 as shown in FIG. 6. This is especially important for the timely reception of critical measurement reports that may be used by the NR-U gNB 502. The NR-U base station 502 would again be assumed to be synchronized with the NR base station 542 and thus all related base station signalling could be exchanged via the appropriate interface (e.g. X2, Xn, Xw)

FIG. 7 shows the conceptual signal flow diagram 700. The licensed base station 542 and NR-U base station 502 may agree beforehand for the admittance of at least a set of UEs (in particular, UE 562) based on pre-determined criteria (low load, best signal quality, etc). This could also enable the addition of the licensed base station as secondary cell (SCell) to exploit an additional robust control signalling link.

The UE 562 may be configured with a channel access timer via system information to trigger the split bearer C-plane connection as seen in the exemplary messages below:

SystemInformationBroadcast (SIB) Message

```
-- ASN1START
-- TAG-OTHER-SI-INFO-START
SI-SchedulingInfo ::=              SEQUENCE {
    schedulingInfoList             SEQUENCE (SITE (1..maxSI-
Message)) OF SchedulingInfo,
    si-WindowLength                ENUMERATED {s5, s10, s20,
s40, s80, s160, s320, s640, s1280},
    si-RequestConfig               SI-RequestConfig
OPTIONAL,   -- Cond MSG-1
    si-RequestConfigSUL            SI-RequestConfig
OPTIONAL,   -- Cond SUL-MSG-1
    systemInformationAreaID        BIT STRING (SIZE (24))
OPTIONAL,   -- Need R
    ...
    ue-TimersAndConstants          UE-TimersAndConstants
}
```

-continued

```
SchedulingInfo ::=              SEQUENCE {
    si-BroadcastStatus          ENUMERATED {broadcasting,
notBroadcasting},
    si-Periodicity              ENUMERATED {rf8, rf16,
rf32, rf64, rf128, rf256, rf512},
    sib-MappingInfo             SIB-Mapping
    Channel Access Timer
}
SIB-Mapping ::=                 SEQUENCE (SIZE (1..maxSIB)) OF
SIB-TypeInfo
SIB-TypeInfo ::=                SEQUENCE {
    type                        ENUMERATED {sibType2,
sibType3, sibType4, sibType5, sibType6, sibType7, sibType8,
sibType9,
                                                    spare8,
spare7, spare6, spare5, spare4, spare3, spare2, spare1,... },
    valueTag                    INTEGER (0..31)
OPTIONAL, -- Cond SIB-TYPE
    areaScope                   ENUMERATED {true}
OPTIONAL -- Cond AREA-ID
}
...
-- TAG-OTHER-SI-INFO-STOP
-- ASN1STOP
```

UE-TimersAndConstants Information Element-ChannelAccessTimer

```
-- ASN1START
UE-TimersAndConstants ::=       SEQUENCE {
    tChannelAccess              ENUMERATED {
                                ms100, ms200, ms300, ms400,
ms600, ms1000, ms1500,
                                ms2000}
    t300                        ENUMERATED {
                                ms100, ms200, ms300, ms400,
ms600, ms1000, ms1500,
                                ms2000},
    t301                        ENUMERATED {
                                ms100, ms200, ms300, ms400,
ms600, ms1000, ms1500,
                                ms2000},
    t310                        ENUMERATED {
                                ms0, ms50, ms100, ms200, ms500,
ms1000, ms2000},
    n310                        ENUMERATED {
                                n1, n2, n3, n4, n6, n8, n10, n20},
    t311                        ENUMERATED {
                                ms1000, ms3000, ms5000, ms10000,
ms15000,
                                ms20000, ms30000},
    n311                        ENUMERATED {
                                n1, n2, n3, n4, n5, n6, n8, n10},
    ...,
...
    ]]
}
-- ASN1STOP
```

UE-TimersAndConstants -IEs field descriptions tChannelAccess
This timer is initiated upon initiation UE initiated COT after several LBT failed attempts.

RRCReconfiguration Message-New Split Bearer Configuration

```
-- ASN1START
-- TAG-RECONFIGURATION- START
RRCReconfiguration ::=          SEQUENCE {
    rrc-TransactionIdentifier   RRC-TransactionIdentifier,
    criticalExtensions          CHOICE {
        rrcReconfiguration      RRCReconfiguration-
IEs,
        criticalExtensionsFuture    SEQUENCE { }
    }
}
RRCReconfiguration-IEs ::=      SEQUENCE {
    radioBearerConfig           RadioBearerConfig
OPTIONAL, -- Need M [Contains splitbearer configuration of new
licensed gNB]
    secondaryCellGroup          OCTET STRING
(CONTAINING CellGroupConfig)
OPTIONAL, -- Need M
    measConfig                  MeasConfig
OPTIONAL, -- Need M
    lateNonCriticalExtension    OCTET STRING
OPTIONAL,
    nonCriticalExtension        RRCReconfiguration-
v1530-IEs                                       OPTIONAL
}
...
...
}
MasterKeyUpdate ::=             SEQUENCE {
    keySetChangeIndicator       BOOLEAN,
    nextHopChainingCount        NextHopChainingCount,
    nas-Container               OCTET STRING
        OPTIONAL,  -- Cond securityNASC
...
```

| RRCReconfiguration-IEs field descriptions |
| --- |
| dedicatedNAS-MessageList
This field is used to transfer UE specific NAS layer information between the network and the UE. The RRC layer is transparent for each PDU in the list.
fullConfig
Indicates that the full configuration option is applicable for the RRCReconfiguration message.
masterCellGroup
Configuration of master cell group.
nas-Container
This field is used to transfer UE specific NAS layer information between the network and the UE. The RRC layer is transparent for this field, although it affects activation of AS-security after inter-system handover to NR. The content is defined in TS 24.501.
radioBearerConfig
Configuration of Radio Bearers (DRBs, SRBs) including SDAP/PDCP. In EN-DC this field may only be present if the RRCReconfiguration is transmitted over SRB3. This indicates the new signal bearer for the new licensed gNB.
secondaryCellGroup
Configuration of secondary cell group (EN-DC). |

Scenario 2: The concept of switching C-plane connections in Scenario 1 can also apply to synchronous NR-U gNBs. Although, the key reason to initiate DC to another NR-U cell would be due to a lightly loaded cell (with low traffic). The same LBT vulnerabilities would be present when performing a NR-U dual connectivity with the advantage of double LBT opportunities for receiving control plane signalling.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier.

In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Equal or equivalent elements or elements with equal or equivalent functionality are denoted in the following description by equal or equivalent reference numerals even if occurring in different figures.

| | |
| --- | --- |
| NR-U | New Radio Unlicensed |
| eNB | Evolved Node B (3G base station) |
| LTE | Long-Term Evolution |
| UE | User Equipment (User Terminal) |
| RSU | Road Side Unit |
| Uu | eNB-UE link |
| PC5 | UE-UE link |
| D2D | Device-to-device |
| IE | Information Element |
| V2V | Vehicular-to-vehicular communications |
| V2X | Vehicular-to-everything communications |
| SRB | Signal Radio Bearer |
| DMTC | Discovery Measurement Time Configuration |
| RMTC | RSSI Measurement Time Configuration |
| DRS | Discovery Reference Symbol (Signal) |
| LBT | Listen-Before-Talk |
| RACH | Random Access Channel |
| LAA | Licensed Assisted Access |
| gNB | NR base stations |
| CBR | Channel Busy Ratio |

REFERENCES

[1] ETSI, "Broadband Radio Access Networks (BRAN) 5 GHz high performance RLAN Harmonized EN covering the essential requirements of article 3.2 of the R&TTE Directive", ETSI EN 301 893 V1.7.1, June 2012.
[2] 3GPP, "Study on LAA to Unlicensed Spectrum", TR 36.889 V 13.0.0, June 2015.
[3] 3GPP, "Study on NR-based Access to Unlicensed Spectrum", TR 38.889 V 0.3.0, November 2018.
[4] Rohde & Schwarz, "Lte-Advanced Pro Introduction eMBB Technology Components in 3GPP Release 13/14", Tech. Report, No. PD 5215.8258.52, May 2018.
[5] B. Ng, H. Si, A. Papasakellariou and J. C. Zhang, "Unified access in licensed and unlicensed bands in LTE-A Pro and 5G", *Industrial Technology Advances*, vol. 6, no. 6, pp. 1-7, June 2017.
[6] 3GPP, "Radio Resource Control (RRC) protocol specification (Release 15)", TR 38.331, V 15.3.0, September 2018.
[7]
[8]
[9]

The invention claimed is:

1. A user equipment, (UE) configured for exchanging control signals, in uplink (UL) and/or downlink (DL) with a first cell and at least one second cell, wherein the first cell is a licensed or unlicensed cell and the at least one second cell is an unlicensed cell,
wherein the UE is configured to exchange control signals with the first cell and, meanwhile:
receive, from the first cell, assistance information for assisting the UE in receiving at least one discovery reference signal, wherein the assistance information comprises at least timing information regarding the timing of the at least one discovery reference signal periodically sent by the at least one second cell;
perform measurement(s) on the at least one discovery reference signal as acquired by the UE, from the at least one second cell, using the timing information comprised in the assistance information,
wherein the UE is configured to perform a handover (HO) decision on whether to initiate a HO procedure, so that the UE communicates with a second cell, wherein the HO procedure is based on the performed measurement(s) on the at least one discovery reference signal,
wherein the UE is configured to perform the HO decision based on the performed measurement(s) on the at least one discovery reference signal as acquired, so that the HO decision follows the performed measurement(s) being over a measurement threshold indicative of an increased quality.

2. The UE of claim 1, configured to send a measurement report to the first cell, the measurement report comprising information concerning the performed measurement(s).

3. The UE of claim 1, configured to perform a HO decision to start the HO procedure and to send a notification of the HO decision to at least one cell among the first cell and the at least one second cell.

4. The UE of claim 1, configured to initiate the HO at the reception of a notification of a HO decision from at least one cell among the first cell and the at least one second cell.

5. The UE of claim 1, wherein the HO decision is based at least on the status of the communication between the UE and the first cell and/or the occupancy of the first cell and at least one second cell, so that the HO decision follows the status being associated to a reduced quality and/or a better quality offered by at least one second cell.

6. The UE of claim 1, wherein the HO decision involves a choice between a plurality of second cells, wherein the choice is based at least on the performed measurement(s) on the multiple discovery reference signals, as acquired by the UE, from the plurality of second cells, and/or on the status of the second cell, so as to choose a second cell associated to an increased quality.

7. The UE of claim 1, wherein the HO decision is performed after that the UE has performed the measurement(s).

8. The UE of claim 1, wherein the assistance information comprises information regarding the periodicity of the first reference signal and the at least one second reference signal.

9. The UE of claim 1, wherein the assistance information comprises information regarding the time length of a measurement window of the first reference signal and the at least one second reference signal.

10. The UE of claim 1, wherein the assistance information comprises information regarding a time offset associated to a measurement window for the of the first reference signal and the at least one second reference signal.

11. The UE of claim 1, wherein the assistance information comprises identification information associated to at least one of the first reference signal, the at least one second reference signal, the first cell, the at least one second cell, the network, the beam.

12. The UE of claim 1, wherein the assistance information comprises frequency information associated to at least one of the carrier, frequency, and/or bandwidth, of the first reference signal and/or the at least one second reference signal.

13. The UE of claim 1, wherein the assistance information comprises sequence information indicating the type of signal used for discovery and measurement.

14. The UE of claim 1, wherein the assistance information comprises technology information and/or standard information associated to the at least one second cell.

15. A base station, BS, configured for exchanging control signals, in uplink (UL) and/or downlink (DL) with a user equipment (UE) and at least one second cell, wherein the BS is a licensed or unlicensed BS and the at least one second cell is an unlicensed cell, wherein the BS is configured to:
signal, to the UE, assistance information for assisting the UE in receiving at least one discovery reference signal, wherein the assistance information comprises at least timing information regarding the timing of at least one discovery reference signal periodically sent by the at least one second cell;

receive, form the UE, information on a handover (HO) decision on whether to initiate a HO procedure, so that the BS receives, from the UE, information on a second cell, wherein the HO procedure is based on the performed measurement(s) on the at least one discovery reference signals, wherein the UE is configured to perform the HO decision based on the performed measurement(s) on the at least one discovery reference signals as acquired, so that the HO decision follows the performed measurement(s) being over a measurement threshold indicative of an increased quality.

16. A method involving a first cell and second cell, wherein the first cell is a licensed or unlicensed cell and the second cell is an unlicensed cell, the method comprising:

signalling, from the first cell to the a user equipment (UE), assistance information for assisting the UE in receiving discovery reference signals, wherein the assistance information comprises at least timing information regarding the timing of at least one discovery reference signal periodically sent by the second cell performing, by the UE, measurement(s) on the at least one discovery reference signal as acquired by the UE from the at least one second cell, using the timing information comprised in the assistance information, performing, by the UE, a handover (HO) decision on whether to initiate a HO procedure, the UE communicating a second cell, wherein the HO procedure is based on the performed measurement(s) on the at least one discovery reference signal, wherein the UE performs the HO decision based on the performed measurement(s) on the at least one discovery reference signal as acquired, so that the HO decision follows the performed measurement(s) being over a measurement threshold indicative of an increased quality.

* * * * *